US012621331B2

(12) United States Patent
Bendersky et al.

(10) Patent No.: US 12,621,331 B2
(45) Date of Patent: May 5, 2026

(54) DETECTION OF SECURITY RISKS BASED ON SECRETLESS CONNECTION DATA

(71) Applicant: CyberArk Software Ltd., Petach-Tikva (IL)

(72) Inventors: Arthur Bendersky, Petach-Tivka (IL); Tal Zigman, Petach-Tikva (IL); Nir Popik, Petach-Tikva (IL); Boris Spivak, Petach-Tikva (IL)

(73) Assignee: CyberArk Software Ltd., Petach-Tikva (IL)

( * ) Notice: Subject to any disclaimer, the term of this patent is extended or adjusted under 35 U.S.C. 154(b) by 600 days.

(21) Appl. No.: 17/368,136

(22) Filed: Jul. 6, 2021

(65) Prior Publication Data

US 2022/0159029 A1     May 19, 2022

Related U.S. Application Data

(63) Continuation-in-part of application No. 17/097,809, filed on Nov. 13, 2020, now Pat. No. 11,552,943.

(51) Int. Cl.
H04L 9/40          (2022.01)
H04W 12/63      (2021.01)

(52) U.S. Cl.
CPC ...... H04L 63/1433 (2013.01); H04L 63/0209 (2013.01); H04L 63/0807 (2013.01);
(Continued)

(58) Field of Classification Search
None
See application file for complete search history.

(56) References Cited

U.S. PATENT DOCUMENTS 3,963,872 A *  6/1976  Hagstrom .............. H04Q 3/521
                                                     379/245
4,532,627 A *  7/1985  Smitt .................. G06F 13/3625
                                                     398/60

(Continued)

OTHER PUBLICATIONS

Jeong "Deep Neural Network Algorithm Feedback Model with Behavioral Intelligence and Forecast Accuracy," Symmetry, pp. 1-17 (Year: 2020).*

(Continued)

*Primary Examiner* — Luu T Pham
*Assistant Examiner* — James J Wilcox
(74) *Attorney, Agent, or Firm* — Finnegan, Henderson, Farabow, Garrett & Dunner, LLP

(57)          ABSTRACT

Disclosed embodiments relate to systems and methods for detecting and addressing security risks in remote native access sessions. Techniques include identifying a remote native access session between a client and a target resource. The techniques may further include identifying connection data associated with the remote native access session obtained by a connection agent, wherein the connection data originates from the client and from a mobile device associated with a user, and comprises data indicative of at least one of: hardware of the client or mobile device, configuration settings of the client or mobile device, and network connection attributes of the client or mobile device. Techniques may further include comparing a first portion of the connection data associated with the client with a second portion of the connection data associated with the mobile device; and determining, based on the comparing, a security risk associated with the remote native access session.

19 Claims, 6 Drawing Sheets

600

(52) U.S. Cl.
  CPC ........ *H04L 63/083* (2013.01); *H04L 63/0853* (2013.01); *H04L 63/18* (2013.01); *H04W 12/63* (2021.01); *H04L 63/1416* (2013.01)

(56)                References Cited

U.S. PATENT DOCUMENTS

| | | | |
|---|---|---|---|
| 4,591,967 A * | 5/1986 | Mattes ................. | G05B 19/052 710/110 |
| 5,742,845 A * | 4/1998 | Wagner ............. | G06Q 30/0601 705/26.1 |
| 6,219,669 B1 * | 4/2001 | Haff ................... | H04L 63/0442 |
| 7,315,826 B1 * | 1/2008 | Guheen ............. | G06Q 30/0201 705/7.29 |
| 7,424,543 B2 * | 9/2008 | Rice, III ............... | G06F 16/182 715/744 |
| 7,606,902 B2 * | 10/2009 | Rao ........................ | H04L 45/72 709/224 |
| 7,716,077 B1 * | 5/2010 | Mikurak ........... | G06Q 10/0631 705/7.12 |
| 7,873,509 B1 * | 1/2011 | Budzinski ........... | G06F 16/3334 704/9 |
| 8,065,712 B1 * | 11/2011 | Cheng .................. | H04L 63/105 726/4 |
| 8,121,874 B1 * | 2/2012 | Guheen ............... | G06Q 10/087 705/28 |
| 8,207,816 B2 * | 6/2012 | Crigger ............... | G07C 9/253 340/5.52 |
| 8,230,232 B2 * | 7/2012 | Ahmed .................. | G06F 21/36 713/186 |
| 8,255,971 B1 * | 8/2012 | Webb ................. | G06Q 20/4014 705/17 |
| 8,272,045 B2 * | 9/2012 | Azeez .................. | H04L 63/029 713/168 |
| 8,423,511 B1 * | 4/2013 | Bhatia ................. | G06F 11/1464 707/654 |
| 8,462,677 B1 | 6/2013 | Gailloux et al. | |
| 8,485,428 B1 * | 7/2013 | Barker ............... | G06F 21/6218 235/375 |
| 8,533,834 B1 * | 9/2013 | Wong ...................... | H04L 63/14 709/224 |
| 8,584,247 B1 * | 11/2013 | Patil ..................... | G06Q 10/101 726/4 |
| 8,590,046 B2 * | 11/2013 | Baikalov ................. | G06F 21/56 709/224 |
| 8,677,132 B1 * | 3/2014 | Liao ......................... | H04L 9/321 713/176 |
| 8,793,779 B2 * | 7/2014 | Ferchichi ............. | H04L 63/062 726/19 |
| 8,826,426 B1 * | 9/2014 | Dubey ............... | H04L 63/1433 726/25 |
| 8,837,806 B1 * | 9/2014 | Ethington .......... | G06Q 20/0425 382/140 |
| 8,850,049 B1 * | 9/2014 | Qureshi ............. | H04L 12/2856 709/224 |
| 8,856,910 B1 * | 10/2014 | Rostami-Hesarsorkh .................... H04L 63/1408 713/168 |
| 8,869,284 B1 * | 10/2014 | Mao ...................... | G06F 21/577 726/23 |
| 8,869,286 B1 * | 10/2014 | Liu .................... | H04L 63/1433 726/25 |
| 8,869,300 B2 * | 10/2014 | Singh .................. | G06F 9/45558 718/1 |
| 8,874,685 B1 * | 10/2014 | Hollis .................... | H04L 63/20 713/153 |
| 8,914,406 B1 * | 12/2014 | Haugsnes ........... | G06F 9/45558 710/316 |
| 8,937,658 B2 * | 1/2015 | Hicks, III ........ | G08B 13/19658 340/541 |
| 8,955,038 B2 * | 2/2015 | Nicodemus ............. | G06F 21/55 717/172 |
| 8,978,104 B1 * | 3/2015 | Wilkinson .......... | G06F 21/6218 709/217 |
| 9,003,535 B1 * | 4/2015 | Franklin ............. | H04L 63/1433 713/168 |
| 9,027,139 B2 * | 5/2015 | Attanasio .............. | H04L 63/145 726/24 |
| 9,065,849 B1 * | 6/2015 | Rivera .................. | H04L 63/145 |
| 9,077,747 B1 * | 7/2015 | Chen .............. | H04L 63/1433 |
| 9,088,604 B1 * | 7/2015 | Chen ...................... | H04L 63/12 |
| 9,100,426 B1 * | 8/2015 | Fang ..................... | G06F 21/50 |
| 9,105,000 B1 * | 8/2015 | White .................. | G06F 16/244 |
| 9,124,649 B1 * | 9/2015 | Wilkinson ............ | H04L 67/025 |
| 9,166,997 B1 * | 10/2015 | Guo ......................... | G06F 21/554 |
| 9,246,899 B1 * | 1/2016 | Durney .................. | H04L 63/08 |
| 9,246,933 B1 * | 1/2016 | Krishnappa ........... | H04L 51/212 |
| 9,246,941 B1 * | 1/2016 | Gibson .................. | H04L 63/20 |
| 9,323,930 B1 * | 4/2016 | Satish ................ | G06F 21/566 |
| 9,332,022 B1 * | 5/2016 | Ashley ............... | H04L 63/1433 |
| 9,350,757 B1 * | 5/2016 | Falkowitz ............. | H04L 67/14 |
| 9,398,042 B1 * | 7/2016 | Dodke ............... | H04L 63/1433 |
| 9,407,509 B2 * | 8/2016 | Porras ............... | H04L 63/1458 |
| 9,485,606 B1 * | 11/2016 | Song ............... | H04L 63/1416 |
| 9,501,795 B1 * | 11/2016 | Friedman .............. | G06Q 40/06 |
| 9,516,010 B1 * | 12/2016 | Avital .................... | H04W 4/80 |
| 9,516,053 B1 * | 12/2016 | Muddu .............. | G06F 3/04847 |
| 9,537,880 B1 * | 1/2017 | Jones ............... | H04L 63/1433 |
| 9,578,053 B2 * | 2/2017 | Husain ............... | H04L 63/1441 |
| 9,619,965 B1 * | 4/2017 | Hill ...................... | G07F 17/3227 |
| 9,628,448 B2 | 4/2017 | Hayton | |
| 9,686,275 B2 * | 6/2017 | Chari .................. | H04L 63/0861 |
| 9,736,147 B1 * | 8/2017 | Mead ...................... | G06F 21/31 |
| 9,742,801 B1 * | 8/2017 | Smith .................. | G06F 21/56 |
| 9,800,606 B1 * | 10/2017 | Yumer ............... | H04L 63/1416 |
| 9,804,866 B2 * | 10/2017 | Halls ...................... | G06F 21/79 |
| 9,811,659 B1 * | 11/2017 | Asheghian .......... | H04L 63/1416 |
| 9,838,405 B1 * | 12/2017 | Guo .................... | H04L 63/1433 |
| 9,843,934 B1 * | 12/2017 | Jiang ................. | H04W 12/12 |
| 9,852,294 B1 * | 12/2017 | Zhu ........................ | G06F 21/562 |
| 9,913,201 B1 * | 3/2018 | Harmon .............. | H04W 4/023 |
| 9,922,345 B2 * | 3/2018 | Mikurak ........... | G06Q 30/0261 |
| 9,973,525 B1 * | 5/2018 | Roturier ............. | H04L 63/1433 |
| 10,015,173 B1 * | 7/2018 | Efstathopoulos ... | H04L 63/0442 |
| 10,055,586 B1 * | 8/2018 | Roundy ............. | H04L 63/1441 |
| 10,068,089 B1 * | 9/2018 | Shavell ................. | H04W 12/12 |
| 10,075,456 B1 * | 9/2018 | Morparia .......... | H04L 63/1425 |
| 10,079,850 B1 * | 9/2018 | Patil .................. | G06F 21/577 |
| 10,091,231 B1 * | 10/2018 | Gates .................. | H04L 63/1425 |
| 10,102,570 B1 * | 10/2018 | Kapczynski .......... | G06Q 40/02 |
| 10,116,680 B1 * | 10/2018 | Han ...................... | G06F 21/566 |
| 10,178,122 B1 * | 1/2019 | Shavell ................ | H04L 63/1441 |
| 10,200,395 B1 * | 2/2019 | Roundy ............. | H04L 63/1433 |
| 10,237,294 B1 * | 3/2019 | Zadeh .................. | H04L 61/103 |
| 10,255,445 B1 * | 4/2019 | Brinskelle ............ | G06F 21/606 |
| 10,257,229 B1 * | 4/2019 | Kuo ........................ | H04L 63/20 |
| 10,277,586 B1 | 4/2019 | Yau et al. | |
| 10,277,618 B1 * | 4/2019 | Wu ........................ | H04L 63/105 |
| 10,277,624 B1 * | 4/2019 | Magar .................. | H04W 12/63 |
| 10,277,625 B1 * | 4/2019 | Efstathopoulos ... | H04L 63/1433 |
| 10,277,629 B1 * | 4/2019 | Guntur .................. | G06F 16/285 |
| 10,284,587 B1 * | 5/2019 | Schlatter ............ | H04L 63/1441 |
| 10,305,758 B1 * | 5/2019 | Bhide .................. | G06F 11/328 |
| 10,313,386 B1 * | 6/2019 | Roturier ............... | H04L 63/083 |
| 10,326,788 B1 * | 6/2019 | Bajpai ............... | H04L 63/1416 |
| 10,333,898 B1 * | 6/2019 | Moore ............... | H04L 63/1433 |
| 10,341,377 B1 * | 7/2019 | Dell'Amico ........ | H04L 63/1433 |
| 10,348,755 B1 * | 7/2019 | Shavell ................ | H04W 48/02 |
| 10,348,758 B1 * | 7/2019 | Holl ...................... | H04L 63/145 |
| 10,348,767 B1 * | 7/2019 | Lee ................... | H04L 63/1416 |
| 10,356,120 B1 * | 7/2019 | Raviv ............... | H04L 63/083 |
| 10,425,394 B1 * | 9/2019 | Smith ............... | H04W 12/082 |
| 10,437,994 B1 * | 10/2019 | Shen ...................... | G06F 21/552 |
| 10,447,720 B1 * | 10/2019 | Evans ............... | H04L 63/0428 |
| 10,492,072 B1 * | 11/2019 | Sokolov ............... | H04L 67/12 |
| 10,505,825 B1 * | 12/2019 | Bettaiah ............ | G06F 16/24578 |
| 10,516,680 B1 * | 12/2019 | Vervier .............. | H04L 63/1416 |
| 10,516,695 B1 * | 12/2019 | Evans ............... | H04L 63/1425 |
| 10,536,466 B1 * | 1/2020 | Griffin ................. | G06F 16/951 |
| 10,542,017 B1 * | 1/2020 | Gates .................. | G06N 20/00 |
| 10,547,633 B1 * | 1/2020 | Dell'Amico ......... | H04L 41/024 |

(56) References Cited

U.S. PATENT DOCUMENTS

| | | | | |
|---|---|---|---|---|
| 10,567,417 B1* | 2/2020 | Dinning | G06F 16/21 |
| 10,630,677 B1* | 4/2020 | Li | H04L 63/1491 |
| 10,630,702 B1* | 4/2020 | Irwan | H04L 9/3239 |
| 10,666,675 B1* | 5/2020 | Koul | 439/135 |
| 10,673,880 B1* | 6/2020 | Pratt | H04L 63/1425 |
| 10,673,888 B1* | 6/2020 | Dudhe | H04L 63/0861 |
| 10,686,820 B1* | 6/2020 | Sheffer | G06F 21/577 |
| 10,735,468 B1* | 8/2020 | Viljoen | H04L 63/145 |
| 10,778,713 B2* | 9/2020 | Zeng | G06N 3/08 |
| 10,834,084 B2* | 11/2020 | Ouellette | H04L 63/107 |
| 10,887,337 B1* | 1/2021 | Kim | H04L 63/1433 |
| 10,887,360 B1* | 1/2021 | Wang | H04L 65/1043 |
| 10,903,608 B1* | 1/2021 | Khambati | H01R 43/26 |
| 10,924,496 B1* | 2/2021 | Gu | H04L 63/107 |
| 10,939,268 B1* | 3/2021 | Roy | H04W 4/20 |
| 10,951,606 B1* | 3/2021 | Shahidzadeh | H04L 63/107 |
| 10,972,477 B1* | 4/2021 | McCorkendale | H04L 63/1433 |
| 10,972,490 B2* | 4/2021 | Teramoto | H04L 63/145 |
| 10,986,117 B1* | 4/2021 | Agbabian | G06F 21/6218 |
| 11,019,085 B1* | 5/2021 | Sokolov | G06F 21/566 |
| 11,038,920 B1* | 6/2021 | Sellers | H04L 63/1433 |
| 11,061,667 B1* | 7/2021 | Gujarathi | H04L 67/10 |
| 11,070,647 B1* | 7/2021 | Korobov | H04L 67/34 |
| 11,095,683 B1* | 8/2021 | Darak | H04L 63/1433 |
| 11,095,706 B1* | 8/2021 | Ankam | H04L 67/51 |
| 11,128,665 B1* | 9/2021 | Sokolov | H04L 63/1408 |
| 11,146,537 B1* | 10/2021 | Kennedy | H04W 12/08 |
| 11,163,872 B1* | 11/2021 | Marimuthu | H04L 63/205 |
| 11,171,950 B1* | 11/2021 | Zhuravlev | H04L 67/141 |
| 11,172,470 B1* | 11/2021 | Guieu | H04L 41/12 |
| 11,176,276 B1* | 11/2021 | Chen | H04L 63/1433 |
| 11,184,382 B2* | 11/2021 | Stopel | H04L 41/065 |
| 11,196,754 B1* | 12/2021 | Lai | H04L 63/126 |
| 11,201,892 B1* | 12/2021 | Kashitsyn | H04L 63/1433 |
| 11,201,896 B1* | 12/2021 | Watters | H04L 63/1466 |
| 11,277,426 B1* | 3/2022 | Kazemeyni | H04L 63/1416 |
| 11,361,100 B1* | 6/2022 | Gates | G06N 5/043 |
| 11,363,072 B1* | 6/2022 | Relan | G06F 9/451 |
| 11,402,427 B2* | 8/2022 | Inoue | G06Q 50/04 |
| 11,412,384 B1* | 8/2022 | Southern | H04W 4/025 |
| 11,438,382 B1* | 9/2022 | Mhaske | H04L 63/20 |
| 11,463,463 B1* | 10/2022 | Phung | H04L 63/1425 |
| 11,477,290 B1* | 10/2022 | Korobov | H04L 41/0803 |
| 11,503,053 B2* | 11/2022 | Zhang | H04L 63/101 |
| 11,528,292 B1* | 12/2022 | Thanos | H04L 63/145 |
| 11,539,733 B1* | 12/2022 | McTeggart | G06N 20/00 |
| 11,563,764 B1* | 1/2023 | Hoscheit | H04L 63/1433 |
| 11,588,844 B1* | 2/2023 | Lee | H04L 67/56 |
| 11,616,812 B2* | 3/2023 | Vissamsetty | H04L 63/1441 |
| | | | 726/23 |
| 11,641,373 B1* | 5/2023 | Sanchez | H04W 12/02 |
| | | | 726/24 |
| 11,695,800 B2* | 7/2023 | Vissamsetty | H04L 61/5007 |
| | | | 726/23 |
| 11,722,898 B2* | 8/2023 | Han | H04L 63/029 |
| 11,736,440 B2* | 8/2023 | Fenton | H04L 63/1425 |
| | | | 726/13 |
| 11,757,975 B1* | 9/2023 | Pandey | G06F 9/00 |
| | | | 709/219 |
| 11,770,387 B1* | 9/2023 | Shivamoggi | H04L 63/1441 |
| | | | 726/23 |
| 11,803,766 B1* | 10/2023 | Srinivasan | G06N 5/04 |
| 11,831,670 B1* | 11/2023 | Molls | H04L 63/104 |
| 11,997,219 B1* | 5/2024 | Russell | H04L 9/3268 |
| 12,432,218 B1* | 9/2025 | Arutyunov | H04L 63/0838 |
| 12,495,057 B1* | 12/2025 | Kissos | H04L 63/1425 |
| 12,499,278 B1* | 12/2025 | Lee | G06F 21/73 |
| 2002/0098840 A1* | 7/2002 | Hanson | H04L 1/1887 |
| | | | 455/435.3 |
| 2002/0198849 A1* | 12/2002 | Piikivi | G06Q 20/18 |
| | | | 705/76 |
| 2003/0005107 A1* | 1/2003 | Dulberg | H04L 41/046 |
| | | | 709/223 |
| 2003/0043762 A1 | 3/2003 | Pang et al. |

| | | | | |
|---|---|---|---|---|
| 2003/0051026 A1* | 3/2003 | Carter | H04L 63/0263 |
| | | | 709/224 |
| 2003/0065731 A1* | 4/2003 | Mohammed | G06F 21/33 |
| | | | 709/225 |
| 2003/0105859 A1* | 6/2003 | Garnett | G06F 21/55 |
| | | | 709/224 |
| 2004/0038568 A1* | 2/2004 | Woolsey | H05K 7/1489 |
| | | | 439/135 |
| 2004/0098610 A1* | 5/2004 | Hrastar | H04L 63/1408 |
| | | | 726/1 |
| 2004/0123150 A1* | 6/2004 | Wright | G06F 21/32 |
| | | | 726/1 |
| 2004/0123153 A1* | 6/2004 | Wright | G06F 11/30 |
| | | | 380/258 |
| 2004/0123158 A1* | 6/2004 | Roskind | H04L 63/1466 |
| | | | 726/6 |
| 2004/0149550 A1* | 8/2004 | Allen | H01H 9/0264 |
| | | | 200/1 R |
| 2004/0190707 A1* | 9/2004 | Ljubicich | H04M 3/42008 |
| | | | 379/218.01 |
| 2004/0209617 A1* | 10/2004 | Hrastar | H04W 24/00 |
| | | | 455/434 |
| 2004/0209634 A1* | 10/2004 | Hrastar | H04W 12/088 |
| | | | 455/515 |
| 2004/0218602 A1* | 11/2004 | Hrastar | H04L 67/125 |
| | | | 370/390 |
| 2005/0047385 A1* | 3/2005 | Otsuka | H04W 48/16 |
| | | | 370/338 |
| 2005/0055578 A1* | 3/2005 | Wright | G06F 21/32 |
| | | | 726/4 |
| 2005/0160264 A1 | 7/2005 | Kuhn et al. |
| 2005/0162944 A1* | 7/2005 | Ball | G06F 12/023 |
| | | | 711/E12.006 |
| 2005/0174961 A1* | 8/2005 | Hrastar | H04W 12/122 |
| | | | 370/328 |
| 2005/0188221 A1* | 8/2005 | Motsinger | H04L 63/1433 |
| | | | 709/224 |
| 2005/0268113 A1* | 12/2005 | Mahone | H04L 43/00 |
| | | | 713/189 |
| 2005/0272386 A1* | 12/2005 | Kawakami | H04W 76/11 |
| | | | 455/88 |
| 2006/0161970 A1* | 7/2006 | Hopen | H04L 63/10 |
| | | | 726/4 |
| 2006/0248590 A1* | 11/2006 | Johnson | G06F 21/50 |
| | | | 726/26 |
| 2007/0100585 A1* | 5/2007 | Dulberg | G06F 11/0748 |
| | | | 702/184 |
| 2008/0060071 A1* | 3/2008 | Hennan | H04L 63/1416 |
| | | | 726/22 |
| 2008/0082541 A1* | 4/2008 | Davidson | G06Q 10/10 |
| 2008/0123669 A1* | 5/2008 | Oliveti | H01R 13/514 |
| | | | 439/296 |
| 2008/0151032 A1* | 6/2008 | Trafton | B41J 2/1752 |
| | | | 347/108 |
| 2009/0024948 A1 | 1/2009 | Anka |
| 2009/0132813 A1* | 5/2009 | Schibuk | G06Q 20/4014 |
| | | | 726/9 |
| 2009/0201911 A1* | 8/2009 | DuPertuis | H04L 65/104 |
| | | | 370/352 |
| 2009/0300744 A1* | 12/2009 | Guo | G06F 21/34 |
| | | | 726/7 |
| 2009/0320137 A1* | 12/2009 | White | H04L 63/1433 |
| | | | 707/999.102 |
| 2009/0327905 A1 | 12/2009 | Mascarenhas et al. |
| 2010/0011206 A1* | 1/2010 | Kuroko | H04L 63/0428 |
| | | | 709/224 |
| 2010/0131960 A1* | 5/2010 | Suganthi | H04L 67/1008 |
| | | | 718/105 |
| 2010/0198630 A1* | 8/2010 | Page | G06Q 40/08 |
| | | | 705/7.28 |
| 2010/0198631 A1* | 8/2010 | Edwards | G06Q 10/00 |
| | | | 705/35 |
| 2010/0240374 A1* | 9/2010 | Lindoff | H04W 76/19 |
| | | | 455/437 |
| 2010/0275010 A1* | 10/2010 | Ghirardi | H04L 63/0838 |
| | | | 726/5 |

(56)            References Cited

U.S. PATENT DOCUMENTS

2010/0322237 A1*  12/2010  Raja .................... H04L 63/1433
                                                    370/389
2011/0112957 A1*   5/2011  Ingram ................. G06Q 40/03
                                                    705/38
2011/0167475 A1    7/2011  Hoover et al.
2011/0319056 A1*  12/2011  Toy .................... H04W 12/068
                                                    455/412.2
2012/0002815 A1*   1/2012  Wei .................... H04L 63/0272
                                                    380/270
2012/0032945 A1*   2/2012  Dare ....................... G06F 9/451
                                                    345/418
2012/0036220 A1*   2/2012  Dare ......................... G06F 8/61
                                                    709/217
2012/0036245 A1*   2/2012  Dare ................... H04L 65/1063
                                                    709/223
2012/0036442 A1*   2/2012  Dare ......................... G06F 8/60
                                                    715/736
2012/0036552 A1*   2/2012  Dare .................. H04L 41/0803
                                                    726/1
2012/0108219 A1*   5/2012  Kiddie ................... H04W 4/16
                                                    455/414.1
2012/0159647 A1*   6/2012  Sanin ................. G06Q 20/4014
                                                    726/28
2012/0240182 A1*   9/2012  Narayanaswamy ........................
                                                    H04L 63/1433
                                                    726/1
2012/0255022 A1*  10/2012  Ocepek ................. G06F 21/552
                                                    726/25
2012/0272310 A1   10/2012  Souissi
2013/0054480 A1*   2/2013  Ross ...................... G06Q 50/01
                                                    705/319
2013/0102283 A1*   4/2013  Lau .................... G06Q 30/0269
                                                    455/411
2013/0104232 A1*   4/2013  Johnson ................ H04W 12/12
                                                    726/23
2013/0160119 A1*   6/2013  Sartin ................... G06F 21/552
                                                    726/23
2013/0185618 A1*   7/2013  Macciola ............... G06V 10/25
                                                    715/201
2013/0290120 A1*  10/2013  Birenbaum ............ G06Q 30/06
                                                    705/16
2013/0346274 A1*  12/2013  Ferdinand .............. G06Q 40/04
                                                    705/37
2013/0347116 A1*  12/2013  Flores ................. H04L 63/1433
                                                    726/25
2014/0007182 A1*   1/2014  Qureshi ............. G06F 21/6218
                                                    726/1
2014/0013434 A1*   1/2014  Ranum ................. G06F 21/564
                                                    726/24
2014/0018037 A1    1/2014  Shanmugavadivel et al.
2014/0032758 A1*   1/2014  Barton ................. G06F 21/6218
                                                    709/225
2014/0040979 A1*   2/2014  Barton ................. H04W 12/30
                                                    726/1
2014/0088919 A1*   3/2014  Toyama ................. G06F 17/18
                                                    702/181
2014/0108794 A1*   4/2014  Barton ................ H04L 63/0428
                                                    713/165
2014/0109174 A1*   4/2014  Barton ................. H04W 12/06
                                                    726/1
2014/0109175 A1*   4/2014  Barton ................ H04L 63/0807
                                                    726/1
2014/0109178 A1*   4/2014  Barton ................. G06F 21/604
                                                    726/1
2014/0126899 A1*   5/2014  Prakash ................. H04L 45/28
                                                    398/5
2014/0150081 A1*   5/2014  Cooley .................. H04L 67/30
                                                    726/11
2014/0157392 A1*   6/2014  Smith ................... H04L 63/10
                                                    726/9
2014/0181295 A1*   6/2014  Hindawi ............ H04L 41/0893
                                                    709/224

2014/0274122 A1*   9/2014  Tseng .................... G01S 19/396
                                                    455/456.1
2014/0282978 A1*   9/2014  Lerner ................. H04L 63/083
                                                    726/7
2014/0283085 A1*   9/2014  Maestas ............. H04L 63/1433
                                                    726/25
2014/0287685 A1*   9/2014  Griffin ............... H04L 63/0272
                                                    455/41.2
2014/0325223 A1*  10/2014  Turgeman ............. G06F 21/31
                                                    713/168
2014/0325645 A1*  10/2014  Turgeman .......... G06F 3/04892
                                                    726/22
2014/0325646 A1*  10/2014  Turgeman ............. G06F 21/316
                                                    726/22
2014/0325682 A1*  10/2014  Turgeman ............. G06F 21/316
                                                    726/29
2014/0330990 A1*  11/2014  Lang .................... H04L 63/107
                                                    710/14
2014/0344927 A1*  11/2014  Turgeman ............... G06F 21/31
                                                    726/22
2015/0037781 A1*   2/2015  Breed ...................... G09B 7/00
                                                    434/362
2015/0039908 A1    2/2015  Lee et al.
2015/0067775 A1*   3/2015  Cardone ............. H04L 63/0884
                                                    726/3
2015/0074806 A1*   3/2015  Roundy .............. H04L 63/1425
                                                    726/23
2015/0117185 A1*   4/2015  Kim .................. H04W 28/0289
                                                    370/230
2015/0134956 A1*   5/2015  Stachura ............. H04L 63/0815
                                                    713/168
2015/0150125 A1*   5/2015  Dulkin ............... H04L 63/1433
                                                    726/22
2015/0199515 A1*   7/2015  Qureshi ............... G06F 21/566
                                                    726/22
2015/0235017 A1    8/2015  Oberheide et al.
2015/0244729 A1*   8/2015  Mao .................... H04L 63/1433
                                                    726/24
2015/0271284 A1*   9/2015  Hindawi ................. H04L 67/60
                                                    709/213
2015/0271285 A1*   9/2015  Hindawi .............. H04L 67/568
                                                    709/213
2015/0310196 A1*  10/2015  Turgeman ............. H04W 12/06
                                                    726/19
2015/0324390 A1*  11/2015  Macciola ................ H04N 1/40
                                                    707/769
2015/0334125 A1*  11/2015  Bartos ................. G06F 21/552
                                                    726/24
2015/0356471 A1*  12/2015  Shaw ..................... G06Q 10/02
                                                    705/6
2015/0373546 A1*  12/2015  Haugen ............... H04L 41/0869
                                                    726/22
2015/0381602 A1*  12/2015  Grim .................... H04W 12/30
                                                    726/4
2015/0382195 A1*  12/2015  Grim .................... H04W 12/06
                                                    726/4
2016/0027042 A1*   1/2016  Heeter ............. G06Q 30/0248
                                                    705/14.47
2016/0034702 A1*   2/2016  Sikka ................... G06F 21/602
                                                    726/27
2016/0044040 A1*   2/2016  Caffary, Jr. ............. H04L 9/30
                                                    726/4
2016/0044058 A1*   2/2016  Schlauder .......... H04L 63/1433
                                                    726/25
2016/0047569 A1*   2/2016  Fadell .................. G06F 1/3231
                                                    236/1 C
2016/0071105 A1*   3/2016  Groarke ................ G06Q 50/01
                                                    705/44
2016/0072815 A1*   3/2016  Rieke .................... H04L 63/101
                                                    726/3
2016/0099960 A1*   4/2016  Gerritz ............... H04L 63/1433
                                                    726/23
2016/0099963 A1*   4/2016  Mahaffey ............. H04L 63/166
                                                    726/25
2016/0100325 A1*   4/2016  Hain .................... H04W 24/10
                                                    370/241

(56) References Cited

U.S. PATENT DOCUMENTS

| | | | |
|---|---|---|---|
| 2016/0127417 A1* | 5/2016 | Janssen | H04L 63/1433 726/1 |
| 2016/0142497 A1* | 5/2016 | Ullrich | G06F 3/0482 715/738 |
| 2016/0142916 A1* | 5/2016 | Yocam | H04W 4/021 455/411 |
| 2016/0173605 A1* | 6/2016 | Iasi | H04L 67/06 709/219 |
| 2016/0174072 A1* | 6/2016 | Allyn | H04L 51/58 455/411 |
| 2016/0261465 A1* | 9/2016 | Gupta | H04L 43/04 |
| 2016/0306965 A1* | 10/2016 | Iyer | G06Q 10/0635 |
| 2016/0323746 A1* | 11/2016 | Milchtaich | H04W 12/08 |
| 2016/0330230 A1* | 11/2016 | Reddy | H04L 63/166 |
| 2016/0330233 A1* | 11/2016 | Hart | H04L 63/20 |
| 2016/0330245 A1* | 11/2016 | Bell | H04L 63/0823 |
| 2016/0359905 A1* | 12/2016 | Touboul | H04L 63/20 |
| 2016/0366167 A1* | 12/2016 | Yumer | H04L 63/1433 |
| 2016/0371476 A1* | 12/2016 | Turgeman | G06F 3/04842 |
| 2017/0017368 A1* | 1/2017 | Maheshwari | H04L 41/22 |
| 2017/0019421 A1* | 1/2017 | Hebert | G06F 21/577 |
| 2017/0019487 A1* | 1/2017 | Maheshwari | H04L 67/51 |
| 2017/0034204 A1* | 2/2017 | El-Moussa | H04L 63/1433 |
| 2017/0046127 A1* | 2/2017 | Fletcher | G06Q 10/06393 |
| 2017/0046374 A1* | 2/2017 | Fletcher | G06Q 10/20 |
| 2017/0046518 A1* | 2/2017 | Chen | G06F 21/566 |
| 2017/0063911 A1* | 3/2017 | Muddu | H04L 41/145 |
| 2017/0063930 A1* | 3/2017 | Chesla | H04L 63/1425 |
| 2017/0091450 A1* | 3/2017 | Turgeman | H04L 63/145 |
| 2017/0111384 A1* | 4/2017 | Loureiro | H04L 63/1433 |
| 2017/0126636 A1* | 5/2017 | Lor | H04L 63/08 |
| 2017/0134422 A1* | 5/2017 | Shieh | H04L 63/1408 |
| 2017/0146261 A1* | 5/2017 | Rogers | F24F 11/62 |
| 2017/0147681 A1* | 5/2017 | Tankersley | G06F 11/3006 |
| 2017/0163665 A1* | 6/2017 | McDougal | H04L 63/0209 |
| 2017/0163666 A1* | 6/2017 | Venkatramani | H04L 63/1416 |
| 2017/0180339 A1* | 6/2017 | Cheng | G06F 21/31 |
| 2017/0185530 A1* | 6/2017 | Wada | G06F 9/4416 |
| 2017/0192853 A1* | 7/2017 | Alberti | G06F 8/65 |
| 2017/0193526 A1* | 7/2017 | Turgeman | G06Q 30/0185 |
| 2017/0206361 A1* | 7/2017 | Zhu | G06F 16/24578 |
| 2017/0208086 A1* | 7/2017 | Carpenter | H04L 63/1433 |
| 2017/0220964 A1* | 8/2017 | Datta Ray | H04L 63/1433 |
| 2017/0223046 A1* | 8/2017 | Singh | H04L 63/1491 |
| 2017/0237729 A1* | 8/2017 | Uppalapati | H04L 63/20 726/8 |
| 2017/0237760 A1* | 8/2017 | Holeman | H04L 43/026 726/22 |
| 2017/0251347 A1* | 8/2017 | Mehta | H04W 4/08 |
| 2017/0272242 A1* | 9/2017 | Morrell | H04L 9/3242 |
| 2017/0272455 A1* | 9/2017 | Black | H04W 12/069 |
| 2017/0289169 A1* | 10/2017 | Plichta | H04L 63/102 |
| 2017/0289189 A1* | 10/2017 | Bush | H04L 47/2441 |
| 2017/0302642 A1 | 10/2017 | Hindocha | |
| 2017/0310705 A1* | 10/2017 | Gopalakrishna | H04L 41/0886 |
| 2017/0324758 A1* | 11/2017 | Hart | H04L 63/0428 |
| 2017/0331818 A1* | 11/2017 | Kader | H04L 63/0853 |
| 2017/0331828 A1* | 11/2017 | Caldera | H04L 63/0807 |
| 2017/0331840 A1* | 11/2017 | Ranjan | G06F 21/50 |
| 2017/0346846 A1* | 11/2017 | Findlay | H04L 63/1433 |
| 2017/0353496 A1* | 12/2017 | Pai | H04L 63/10 |
| 2017/0372404 A1* | 12/2017 | Wilczek | G06Q 30/0633 |
| 2017/0374095 A1* | 12/2017 | Deori | H04L 63/1433 |
| 2018/0007089 A1* | 1/2018 | Watters | H04L 63/20 |
| 2018/0013631 A1* | 1/2018 | Chen | H04L 41/12 |
| 2018/0041479 A1* | 2/2018 | Wang | H04L 63/0838 |
| 2018/0041529 A1* | 2/2018 | Mixer | H04L 63/0245 |
| 2018/0053253 A1* | 2/2018 | Gokhale | G06Q 40/03 |
| 2018/0063167 A1* | 3/2018 | Rodeck | H04L 63/083 |
| 2018/0069865 A1* | 3/2018 | Rieke | H04L 41/5058 |
| 2018/0077243 A1 | 3/2018 | Mathew et al. | |
| 2018/0097790 A1* | 4/2018 | Caldera | H04L 63/08 |
| 2018/0107820 A1* | 4/2018 | Simakov | G06F 21/50 |
| 2018/0109507 A1* | 4/2018 | Caldera | H04L 63/08 |
| 2018/0173790 A1* | 6/2018 | Krishnamacharya | G06F 16/2272 |
| 2018/0173874 A1* | 6/2018 | Muttik | G06F 21/57 |
| 2018/0176181 A1* | 6/2018 | Fu | H04L 63/10 |
| 2018/0183766 A1* | 6/2018 | Crabtree | H04L 63/0815 |
| 2018/0191751 A1* | 7/2018 | El-Moussa | G06F 16/9024 |
| 2018/0191766 A1* | 7/2018 | Holeman | H04L 63/20 |
| 2018/0192446 A1* | 7/2018 | Skobov | H04W 8/005 |
| 2018/0212957 A1* | 7/2018 | Lee | G06Q 20/4014 |
| 2018/0212992 A1* | 7/2018 | Nikolaev | H04L 43/0876 |
| 2018/0219894 A1* | 8/2018 | Crabtree | H04L 63/20 |
| 2018/0219919 A1* | 8/2018 | Crabtree | G06F 16/2477 |
| 2018/0234323 A1* | 8/2018 | Pope | H04W 12/128 |
| 2018/0234435 A1* | 8/2018 | Cohen | H04L 63/1416 |
| 2018/0255077 A1* | 9/2018 | Paine | H04L 63/1416 |
| 2018/0255080 A1* | 9/2018 | Paine | H04L 63/1466 |
| 2018/0288063 A1* | 10/2018 | Koottayi | G06F 21/50 |
| 2018/0289878 A1* | 10/2018 | Winterwerber | A61M 60/538 |
| 2018/0295154 A1* | 10/2018 | Crabtree | H04L 63/1433 |
| 2018/0314816 A1* | 11/2018 | Turgeman | G06F 21/40 |
| 2018/0316665 A1* | 11/2018 | Caldera | H04L 63/104 |
| 2018/0322292 A1* | 11/2018 | Tedeschi | H04L 63/1433 |
| 2018/0337941 A1* | 11/2018 | Kraning | H04L 63/0227 |
| 2018/0349990 A1* | 12/2018 | Diriye | G06Q 40/03 |
| 2018/0359237 A1* | 12/2018 | Shem Tov | G06F 21/577 |
| 2018/0359639 A1* | 12/2018 | Trama | H04W 48/04 |
| 2018/0375830 A1* | 12/2018 | Delaney | H04L 63/1425 |
| 2018/0375894 A1* | 12/2018 | Vervier | H04L 63/1433 |
| 2018/0375927 A1* | 12/2018 | Nozawa | H04L 43/16 |
| 2019/0018965 A1* | 1/2019 | Hoscheit | H04L 63/1408 |
| 2019/0020674 A1* | 1/2019 | Vervier | H04L 63/1408 |
| 2019/0043054 A1* | 2/2019 | Crank | G06Q 20/4016 |
| 2019/0065736 A1* | 2/2019 | Dharmadhikari | G06F 9/45533 |
| 2019/0068373 A1* | 2/2019 | Konduru | H04L 63/0853 |
| 2019/0081942 A1* | 3/2019 | Suresh | H04L 63/0815 |
| 2019/0081982 A1* | 3/2019 | Breton | H04L 63/145 |
| 2019/0089737 A1* | 3/2019 | Shayevitz | H04L 63/1425 |
| 2019/0099113 A1* | 4/2019 | Röder | A61B 5/6804 |
| 2019/0116193 A1* | 4/2019 | Wang | G06N 20/00 |
| 2019/0121972 A1* | 4/2019 | Norvill | G06F 21/554 |
| 2019/0122149 A1* | 4/2019 | Caldera | H04L 63/102 |
| 2019/0124112 A1* | 4/2019 | Thomas | G06F 21/40 |
| 2019/0132349 A1* | 5/2019 | Blasak da Fonseca | H04L 63/20 |
| 2019/0138726 A1* | 5/2019 | Leal Monteiro | G06F 21/567 |
| 2019/0158503 A1* | 5/2019 | Bansal | H04L 63/0272 |
| 2019/0166098 A1* | 5/2019 | Trama | H04L 63/1408 |
| 2019/0173909 A1* | 6/2019 | Mixer | H04L 41/082 |
| 2019/0182287 A1* | 6/2019 | Hanley | G06N 3/0499 |
| 2019/0188389 A1* | 6/2019 | Peled | H04L 63/20 |
| 2019/0199688 A1* | 6/2019 | Wallace | H04L 63/1425 |
| 2019/0199744 A1* | 6/2019 | Nides | H04L 63/0428 |
| 2019/0222567 A1* | 7/2019 | Caldera | H04L 63/0876 |
| 2019/0236661 A1* | 8/2019 | Hogg | G06F 16/9537 |
| 2019/0250898 A1* | 8/2019 | Yang | H04W 12/08 |
| 2019/0253893 A1* | 8/2019 | Hodroj | H04W 12/06 |
| 2019/0268366 A1* | 8/2019 | Zeng | G06N 3/047 |
| 2019/0297113 A1* | 9/2019 | Yang | H04L 61/256 |
| 2019/0306181 A1* | 10/2019 | Mahadevia | H04L 63/1433 |
| 2019/0306731 A1* | 10/2019 | Raghuramu | H04L 63/1433 |
| 2019/0311134 A1 | 10/2019 | Mahaffey et al. | |
| 2019/0319987 A1* | 10/2019 | Levy | H04L 63/08 |
| 2019/0342162 A1* | 11/2019 | Bendre | H04L 41/12 |
| 2019/0387408 A1* | 12/2019 | Yang | H04W 12/71 |
| 2020/0004946 A1* | 1/2020 | Gilpin | H04L 9/50 |
| 2020/0007570 A1* | 1/2020 | Lam | H04L 63/1433 |
| 2020/0007642 A1* | 1/2020 | Freilich | H04L 67/34 |
| 2020/0028871 A1* | 1/2020 | Thayer | H04L 63/1466 |
| 2020/0043066 A1* | 2/2020 | Obaidi | G06N 20/00 |
| 2020/0050686 A1* | 2/2020 | Kamalapuram | G06F 21/564 |
| 2020/0053096 A1* | 2/2020 | Bendersky | G06F 21/32 |
| 2020/0066071 A1* | 2/2020 | Budman | H04L 63/08 |
| 2020/0076814 A1* | 3/2020 | Cohen | H04L 63/08 |
| 2020/0084029 A1* | 3/2020 | Yang | H04L 63/166 |
| 2020/0092282 A1* | 3/2020 | Childress | G06F 21/44 |
| 2020/0100106 A1* | 3/2020 | Black | H04W 12/06 |
| 2020/0104852 A1* | 4/2020 | Douglas, Jr. | G06Q 30/018 |
| 2020/0106798 A1* | 4/2020 | Lin | H04L 63/1433 |
| 2020/0110833 A1* | 4/2020 | Shivamoggi | G06Q 10/06313 |

(56) References Cited

U.S. PATENT DOCUMENTS

| | | | |
|---|---|---|---|
| 2020/0128039 A1* | 4/2020 | Jalan | H04L 63/101 |
| 2020/0145384 A1* | 5/2020 | Chauhan | H04W 12/69 |
| 2020/0145425 A1* | 5/2020 | Chauhan | H04L 63/107 |
| 2020/0145446 A1* | 5/2020 | Deardorff | H04L 63/20 |
| 2020/0169576 A1* | 5/2020 | Myers | H04L 43/062 |
| 2020/0169581 A1* | 5/2020 | Chalmandrier-Perna | H04L 67/1097 |
| 2020/0184847 A1* | 6/2020 | Gabay | G09B 19/0053 |
| 2020/0213298 A1* | 7/2020 | Ericson | H04W 12/47 |
| 2020/0213361 A1* | 7/2020 | Du | H04L 41/0631 |
| 2020/0225964 A1* | 7/2020 | Soman | H04L 63/105 |
| 2020/0242251 A1* | 7/2020 | Wisgo | G06F 21/564 |
| 2020/0280573 A1* | 9/2020 | Johnson | G06F 21/554 |
| 2020/0287921 A1* | 9/2020 | Karin | H04L 43/062 |
| 2020/0293684 A1* | 9/2020 | Harris | H04L 63/08 |
| 2020/0296137 A1* | 9/2020 | Crabtree | H04L 63/1433 |
| 2020/0296138 A1* | 9/2020 | Crabtree | H04L 63/1425 |
| 2020/0314126 A1* | 10/2020 | Schmugar | H04W 12/12 |
| 2020/0314133 A1* | 10/2020 | Singh | G06F 21/604 |
| 2020/0314134 A1* | 10/2020 | Izrael | H04L 63/1425 |
| 2020/0314650 A1* | 10/2020 | Chu | H04W 12/08 |
| 2020/0322327 A1 | 10/2020 | Suresh | |
| 2020/0322369 A1* | 10/2020 | Raghuramu | H04L 63/102 |
| 2020/0322423 A1* | 10/2020 | Sheth | H04L 63/123 |
| 2020/0358804 A1* | 11/2020 | Crabtree | H04L 63/1433 |
| 2020/0374087 A1* | 11/2020 | Vissamsetty | H04L 63/0272 |
| 2020/0374284 A1 | 11/2020 | Suresh et al. | |
| 2020/0380202 A1* | 12/2020 | Cass | G06F 40/174 |
| 2020/0389495 A1* | 12/2020 | Crabtree | G06F 16/2477 |
| 2020/0403855 A1* | 12/2020 | Sarood | H04L 41/0894 |
| 2020/0404014 A1* | 12/2020 | Pfleger de Aguiar | H04L 63/1408 |
| 2020/0404016 A1* | 12/2020 | Pike | H04L 43/16 |
| 2020/0404502 A1* | 12/2020 | Trivellato | H04L 63/1458 |
| 2020/0412758 A1* | 12/2020 | Trivellato | H04L 63/1441 |
| 2020/0412767 A1* | 12/2020 | Crabtree | H04L 63/1441 |
| 2020/0413251 A1* | 12/2020 | Wei | H04L 67/148 |
| 2021/0019674 A1* | 1/2021 | Crabtree | G06V 30/274 |
| 2021/0021605 A1 | 1/2021 | Innes et al. | |
| 2021/0021629 A1* | 1/2021 | Dani | H04L 63/1433 |
| 2021/0021644 A1* | 1/2021 | Crabtree | G06F 16/951 |
| 2021/0058422 A1* | 2/2021 | Obrecht | H04L 63/1416 |
| 2021/0075700 A1* | 3/2021 | Palladino | H04L 67/562 |
| 2021/0075816 A1* | 3/2021 | S | H04L 63/1416 |
| 2021/0078571 A1* | 3/2021 | Zhu | H04W 12/03 |
| 2021/0084485 A1* | 3/2021 | Roy | H04W 12/35 |
| 2021/0092162 A1* | 3/2021 | Crabtree | H04L 63/1425 |
| 2021/0099451 A1 | 4/2021 | Will et al. | |
| 2021/0099458 A1* | 4/2021 | Su | H04L 63/102 |
| 2021/0099479 A1* | 4/2021 | Prusov | H04L 41/12 |
| 2021/0112072 A1* | 4/2021 | Kratzer | G06F 16/9566 |
| 2021/0126912 A1* | 4/2021 | Maclean | H04W 12/065 |
| 2021/0136101 A1* | 5/2021 | Ben-Yosef | H04L 63/1433 |
| 2021/0150034 A1* | 5/2021 | Rose | G06F 21/577 |
| 2021/0157934 A1* | 5/2021 | Leal Monteiro | G06F 21/55 |
| 2021/0168175 A1* | 6/2021 | Crabtree | G06F 16/951 |
| 2021/0184977 A1* | 6/2021 | Testicioglu | H04L 47/11 |
| 2021/0185073 A1* | 6/2021 | Ewaida | H04L 63/1433 |
| 2021/0185084 A1* | 6/2021 | Sodja | H04L 63/1433 |
| 2021/0194785 A1* | 6/2021 | Raghuramu | H04L 63/1425 |
| 2021/0194911 A1* | 6/2021 | Hecht | H04L 63/1433 |
| 2021/0194913 A1* | 6/2021 | Hecht | H04L 63/105 |
| 2021/0203673 A1* | 7/2021 | dos Santos | H04L 63/1433 |
| 2021/0203731 A1* | 7/2021 | Garty | H04L 67/51 |
| 2021/0218766 A1* | 7/2021 | Soman | G06F 21/6245 |
| 2021/0234677 A1* | 7/2021 | Isenhour | H04L 63/0861 |
| 2021/0243216 A1* | 8/2021 | Shivanna | H04L 63/1433 |
| 2021/0243595 A1* | 8/2021 | Buck | H04L 63/20 |
| 2021/0258329 A1* | 8/2021 | Clayton | H04L 63/0876 |
| 2021/0281609 A1* | 9/2021 | Crabtree | H04L 63/1425 |
| 2021/0288973 A1* | 9/2021 | Dimble | H04W 12/108 |
| 2021/0297443 A1* | 9/2021 | Crabtree | G06F 16/2474 |
| 2021/0297447 A1* | 9/2021 | Crabtree | H04L 9/0643 |
| 2021/0306368 A1* | 9/2021 | Zhang | H04L 63/1433 |
| 2021/0336944 A1 | 10/2021 | Brinckman et al. | |
| 2021/0360032 A1* | 11/2021 | Crabtree | G06F 16/2477 |
| 2021/0385199 A1* | 12/2021 | Jeyachandrasekar | H04L 63/0442 |
| 2021/0385215 A1* | 12/2021 | Summers | H04L 63/0861 |
| 2021/0385653 A1* | 12/2021 | Sau | H04W 12/04 |
| 2021/0406255 A1* | 12/2021 | Raghuramu | G06N 20/00 |
| 2021/0406720 A1* | 12/2021 | Song | H04L 63/1425 |
| 2021/0409385 A1* | 12/2021 | Wang | H04L 9/3247 |
| 2022/0014560 A1* | 1/2022 | Crabtree | H04L 63/1433 |
| 2022/0014561 A1* | 1/2022 | Caceres | G06F 16/951 |
| 2022/0030020 A1* | 1/2022 | Huffman | H04L 63/1425 |
| 2022/0030023 A1* | 1/2022 | Soman | H04L 63/20 |
| 2022/0046047 A1* | 2/2022 | Lewis | H04L 63/1416 |
| 2022/0050751 A1* | 2/2022 | Hazra | G06F 11/3006 |
| 2022/0060453 A1* | 2/2022 | Crabtree | H04L 63/08 |
| 2022/0060497 A1* | 2/2022 | Crabtree | G06N 20/00 |
| 2022/0068106 A1* | 3/2022 | Fregia | H04L 67/12 |
| 2022/0070201 A1* | 3/2022 | Almaz | H04L 63/1416 |
| 2022/0078210 A1* | 3/2022 | Crabtree | G06F 16/9024 |
| 2022/0086173 A1* | 3/2022 | Yavo | H04L 63/1416 |
| 2022/0095977 A1* | 3/2022 | Ancona | A61B 5/201 |
| 2022/0100854 A1* | 3/2022 | Ahmed | G06F 3/0679 |
| 2022/0103569 A1* | 3/2022 | Galloway | H04L 63/0227 |
| 2022/0103592 A1* | 3/2022 | Semel | H04L 63/20 |
| 2022/0116392 A1* | 4/2022 | Shah | H04L 63/0876 |
| 2022/0131844 A1* | 4/2022 | Sherlock | H04L 63/105 |
| 2022/0139518 A1* | 5/2022 | Shawver | G16H 40/63 705/2 |
| 2022/0159029 A1* | 5/2022 | Bendersky | H04L 63/18 |
| 2022/0201008 A1* | 6/2022 | Stergioudis | H04L 63/1425 |
| 2022/0201042 A1* | 6/2022 | Crabtree | G06F 16/2477 |
| 2022/0210200 A1* | 6/2022 | Crabtree | G06F 16/951 |
| 2022/0210202 A1* | 6/2022 | Crabtree | G06F 16/2477 |
| 2022/0224723 A1* | 7/2022 | Crabtree | H04L 63/20 |
| 2022/0244280 A1* | 8/2022 | Hamano | G01N 35/0092 |
| 2022/0253530 A1* | 8/2022 | Leal Monteiro | H04L 9/3247 |
| 2022/0270166 A1* | 8/2022 | Naaman | G06Q 30/08 |
| 2022/0303303 A1* | 9/2022 | Tang | H04L 41/22 |
| 2022/0311681 A1* | 9/2022 | Palladino | H04L 43/0852 |
| 2022/0311822 A1* | 9/2022 | Nord | H04L 63/0435 |
| 2022/0318565 A1* | 10/2022 | Laserson | G16H 30/40 |
| 2022/0319076 A1* | 10/2022 | Milne | G06T 11/001 |
| 2022/0353675 A1* | 11/2022 | Zhu | H04L 9/0838 |
| 2023/0004168 A1* | 1/2023 | Ölsner | G05D 1/0246 |
| 2023/0028740 A1* | 1/2023 | Park | G06Q 30/0637 |
| 2023/0031062 A1* | 2/2023 | Zhang | H04L 61/2575 |
| 2023/0043645 A1* | 2/2023 | Protsenko | A61B 1/31 |
| 2023/0117620 A1* | 4/2023 | Schumacher | H04W 12/40 726/2 |
| 2023/0143780 A1* | 5/2023 | Ahlberg | H04W 40/20 702/188 |
| 2023/0186308 A1* | 6/2023 | Babu | G06Q 20/108 705/44 |
| 2023/0222761 A1* | 7/2023 | Lev | G06T 5/60 382/103 |
| 2023/0254927 A1* | 8/2023 | Ajmeer | H04W 76/19 370/216 |
| 2023/0266819 A1* | 8/2023 | Arbel | G06N 3/09 348/78 |
| 2023/0283641 A1* | 9/2023 | Crabtree | G06N 5/045 726/22 |
| 2023/0288220 A1* | 9/2023 | Beaurepaire | G01C 21/3859 |
| 2023/0308459 A1* | 9/2023 | Crabtree | H04L 63/1416 |
| 2023/0319019 A1* | 10/2023 | Crabtree | H04L 63/0807 713/180 |
| 2023/0319558 A1* | 10/2023 | Ge | H04W 12/77 726/4 |
| 2023/0362142 A1* | 11/2023 | Crabtree | H04L 9/3236 |
| 2023/0362200 A1* | 11/2023 | Crabtree | G06F 16/2477 |
| 2023/0370439 A1* | 11/2023 | Crabtree | H04L 63/0807 |
| 2023/0370490 A1* | 11/2023 | Crabtree | H04L 63/1425 |
| 2023/0370491 A1* | 11/2023 | Crabtree | H04L 63/20 |
| 2023/0388278 A1* | 11/2023 | Crabtree | H04L 63/1433 |
| 2023/0396607 A1* | 12/2023 | Mondello | H04L 63/0823 |
| 2023/0421601 A1* | 12/2023 | Bolger | H04L 63/08 |
| 2024/0015179 A1* | 1/2024 | Opos | H04L 63/1416 |
| 2024/0022589 A1* | 1/2024 | Inokuchi | H04L 63/104 |
| 2024/0022607 A1* | 1/2024 | Lang | H04L 63/20 |

(56)         References Cited

U.S. PATENT DOCUMENTS

| | | | |
|---|---|---|---|
| 2024/0029105 A1* | 1/2024 | Heeter | G06Q 30/018 |
| 2024/0063658 A1* | 2/2024 | Williams | H02J 13/00004 |
| 2024/0305639 A1* | 9/2024 | Zhong | H04L 63/1425 |
| 2024/0380752 A1* | 11/2024 | Khare | H04L 63/0884 |
| 2024/0396880 A1* | 11/2024 | Lim | H04L 9/0825 |
| 2024/0403428 A1* | 12/2024 | Lal | G06F 21/566 |
| 2024/0430247 A1* | 12/2024 | Singh | H04L 63/08 |
| 2025/0030694 A1* | 1/2025 | Ben Dov | H04L 63/102 |
| 2025/0033496 A1* | 1/2025 | Rowland | B60L 53/11 |
| 2025/0080570 A1* | 3/2025 | Ramsue | H04L 63/102 |
| 2025/0086273 A1* | 3/2025 | Lee | G06F 21/554 |
| 2025/0203338 A1* | 6/2025 | Henry | H04W 8/02 |
| 2025/0212055 A1* | 6/2025 | Smith | H04W 28/0289 |
| 2025/0247691 A1* | 7/2025 | Henry | H04W 12/02 |
| 2025/0299801 A1* | 9/2025 | Kimmel | G16H 30/40 |
| 2025/0328666 A1* | 10/2025 | Kumar | G06F 21/6218 |
| 2025/0363819 A1* | 11/2025 | Hever | G06T 7/001 |
| 2025/0380028 A1* | 12/2025 | Kulakowski | H04N 21/4524 |

OTHER PUBLICATIONS

Cabaj et al "Network Threats Mitigation Using Software-Defined Networking for the 5G Internet of Radio Light System," Wiley, pp. 1-23, (Year: 2019).*

Bavota et al "Automating Extract Class Refactoring: An Improved Method and Its Evaluation," Springer, pp. 1617-1664 (Year: 2014).*

Rouzand-Cornabas et al "Secured Architecture for Remote Virtual Desktops," IEEE, pp. 80-87 (Year: 2007).*

Belimpasakis et al "Home Media Atomizer: Remote Sharing of Home Content-without Semi-Trusted Proxies," IEEE Transactions on Consumer Electronics, vol. 54, No. 3, IEEE, pp. 1114-1122 (Year: 2008).*

Wazid et al "Secure Remote User Authenticated Key Establishment Protocol for Smart Home Environment," IEEE Transactions on Dependable and Secure Computing, vol. 17, No. 2, IEEE, pp. 391-406 (Year: 2020).*

Bui et al "Client-Side Vulnerabilities in Commercial VPNs," pp. 1-12, (Year: 2019).*

Chean et al "Authentication Scheme using Unique Identification method with Homomorphic Encryption in Mobile Cloud Computing," IEEE, pp. 195-200 (Year: 2018).*

Sato, "A New Formula of Information Security Risk Analysis that takes Risk Improvement Factor into Account," IEEE Computer Society, pp. 1243-1248 (Year: 2011).*

Seify et al "A Methodology for Mobile Network Security Risk Management," IEEE Computer Society, pp. 1572-1573 (Year: 2009).*

Ashibani et al "An Intelligent Risk-Based Authentication Approach for Smartphone Applications," IEEE, pp. 3807-3812 (Year: 2020).*

Jafari et al "IoT Devices Fingerprinting Using Deep Learning," IEEE, pp. 901-906 (Year: 2018).*

Communication and Search Report issued by the European Patent Office in Application No. 21186783.3-1213, dated Jan. 24, 2022 (10 pages).

Homeland Security "Configuring and Managing Remote Access for Industrial Control Systems," Control Systems Security Program, National Cyber Security Division, CPNI, Centre for Protection of National Infrastructure, Nov. 2010, pp. 1-66 (2010).

* cited by examiner

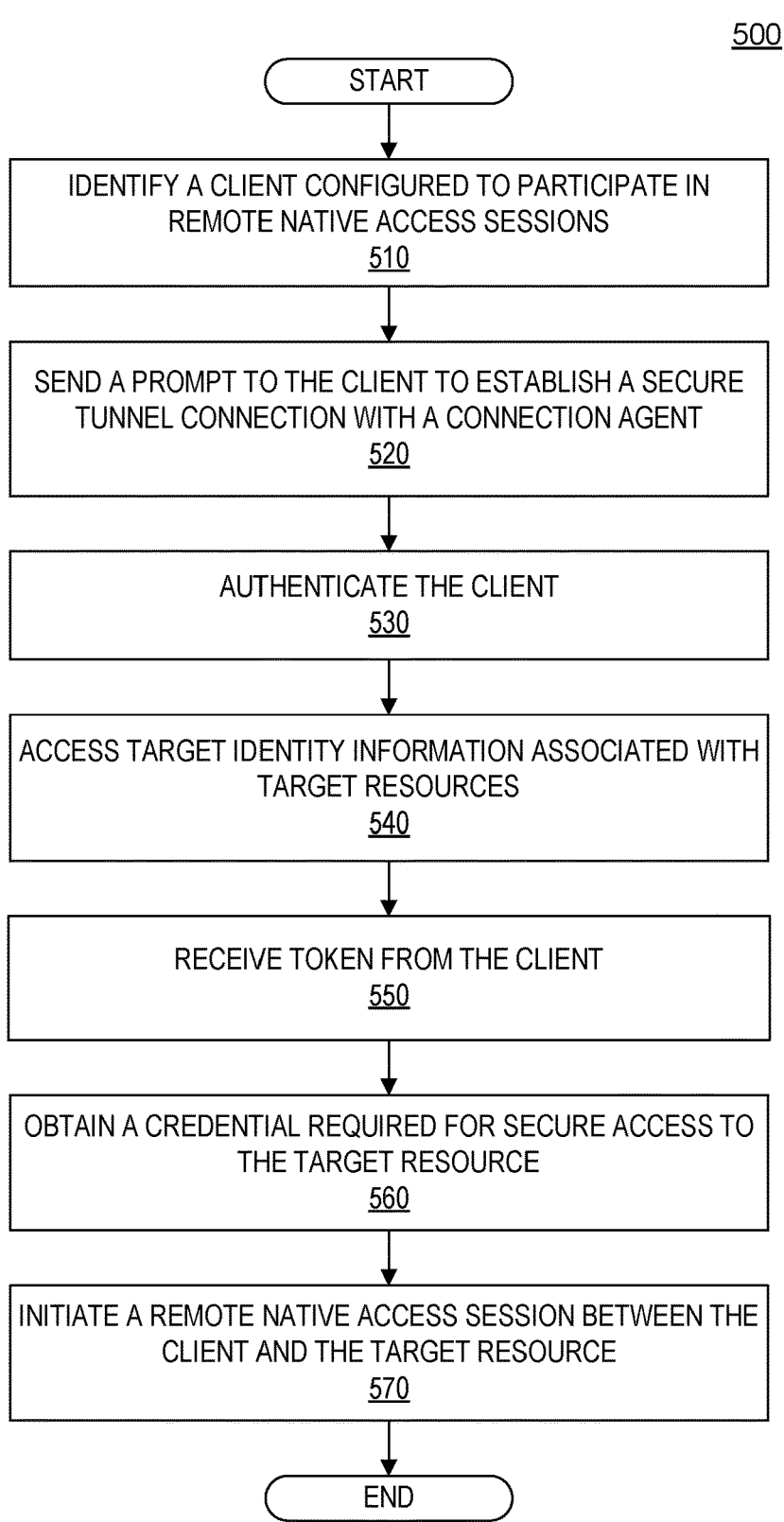

500

START

IDENTIFY A CLIENT CONFIGURED TO PARTICIPATE IN
REMOTE NATIVE ACCESS SESSIONS
510

SEND A PROMPT TO THE CLIENT TO ESTABLISH A SECURE
TUNNEL CONNECTION WITH A CONNECTION AGENT
520

AUTHENTICATE THE CLIENT
530

ACCESS TARGET IDENTITY INFORMATION ASSOCIATED WITH
TARGET RESOURCES
540

RECEIVE TOKEN FROM THE CLIENT
550

OBTAIN A CREDENTIAL REQUIRED FOR SECURE ACCESS TO
THE TARGET RESOURCE
560

INITIATE A REMOTE NATIVE ACCESS SESSION BETWEEN THE
CLIENT AND THE TARGET RESOURCE
570

END

DETECTION OF SECURITY RISKS BASED ON SECRETLESS CONNECTION DATA

RELATED APPLICATIONS

This application is a continuation-in-part of U.S. patent application Ser. No. 17/097,809, filed Nov. 13, 2020.

BACKGROUND

Organizations and individuals increasingly use remote network connections for accessing secure files and other network resources.

For example, many organizations allow individuals to work collaboratively from different offices, from home office locations, or while travelling. As another example, individuals may use cloud-based servers for storing electronic files and may access these files through a remote connection. Thus, these remote connections provide improved flexibility, allowing users to access a network remotely as if their device was connected to the network directly. Although advantageous, these remote connections may present security vulnerabilities and are common targets for malicious actors to gain access to the secure network or user data.

Some existing techniques, such as virtual private networks (VPNs), require the installation of VPN clients, which can be cumbersome for users and often lead to increased operating expenditures for organizations. Further, VPNs often do not discriminate among target resources, and instead provide users with full access to the network. For this reason, VPN clients are common attack points for malicious users, who may target security vulnerabilities to gain access to secure networks and harvest user credentials or other sensitive data. Further, such VPN clients often require users to enter passwords specific to the VPN service, which increases the risk of credentials theft and deteriorates the user's experience. Other techniques, such as HTML5 gateway solutions, do not require the installation of VPN clients, but equally provide a poor user experience by requiring a browser-based session, rather than a native desktop client.

Some remote desktop gateway techniques allow for passwordless or multi-factor authentication, however, additional passwords may be required to access a particular target resource. Further, these remote desktop gateways often require a user to identify details of a target server (such as IP addresses, or port configurations), a domain username, or other sensitive information, which may create an attack vector for malicious actors.

Accordingly, in view of these and other deficiencies in existing techniques, technological solutions are needed for securely establishing passwordless and native remote access sessions. In particular, solutions should advantageously allow for the sessions to be established without requiring separate credentials. Further, technological solutions should allow native access without requiring a dedicated remote access client or other non-native software, such as a web-based interface. Solutions should also be dynamic, allowing secure connections to be established during a connection phase, without potentially exposing sensitive client information, such as usernames or other credentials, or sensitive target details, such as IP addresses or other information for the target host. In addition, once a secure connection is established, a rich set of data from the connection may be gathered. Advantageously, this data can later help in profiling a user's activity in the session and be used to detect potentially malicious or anomalous activity.

SUMMARY

The disclosed embodiments describe non-transitory computer readable media, systems, and methods for securely establishing secretless and remote native access sessions. For example, in an embodiment, a non-transitory computer readable medium may include instructions that, when executed by at least one processor, cause the at least one processor to perform operations for securely establishing secretless and remote native access sessions. The operations may comprise identifying a client configured to participate in remote native access sessions, wherein the client has a remote access protocol file that has been modified to include an identifier associated with the client; sending a prompt to the client to establish a secure tunnel connection with a connection agent using the identifier associated with the client; authenticating the client; accessing target identity information associated with one or more target resources; receiving from the client a token that identifies a target resource from among the one or more target resources; obtaining, based on the token, a credential required for secure access to the target resource; and initiating, using the credential, a remote native access session between the client and the target resource.

According to a disclosed embodiment, the remote access protocol file may be modified by the client.

According to a disclosed embodiment, the connection agent may replace a username in a request for the remote native access session with data from the token.

According to a disclosed embodiment, the credential may be obtained in a secretless manner from the perspective of the client.

According to a disclosed embodiment, the target identity information may be associated with a plurality of target resources.

According to a disclosed embodiment, the operations may further comprise receiving a selection by the client of the target resource from among the plurality of target resources.

According to a disclosed embodiment, the plurality of target resources may be identified based on access rights of the client.

According to a disclosed embodiment, the plurality of target resources may be identified based on the authentication of the client.

According to a disclosed embodiment, the remote access protocol file may be a remote desktop protocol.

According to a disclosed embodiment, the identifier associated with the client may be at least one of: a mobile telephone number, and email address, a user name, an account name, or a custom identifier created by the client.

According to another disclosed embodiment, there may be a computer-implemented method for securely establishing secretless and remote native access sessions. The method may comprise identifying a client configured to participate in remote native access sessions, wherein the client has a remote access protocol file that has been modified to include an identifier associated with the client; sending a prompt to the client to establish a secure tunnel connection with a connection agent using the identifier associated with the client; authenticating the client; accessing target identity information associated with one or more target resources; receiving from the client a token that identifies a target resource from among the one or more target resources; obtaining, based on the token, a credential required for secure access to the target resource; and initiating, using the credential, a remote native access session between the client and the target resource.

According to a disclosed embodiment, the credential may be obtained from a secure credentials vault.

According to a disclosed embodiment, the credential may be obtained without making the credential available to the client.

According to a disclosed embodiment, the credential may be obtained locally at the client, and deleted at the client upon termination of the remote native access session.

According to a disclosed embodiment, the target identity information may be associated a plurality of target resources.

According to a disclosed embodiment, the method may further comprise sending to the client data for generating a selectable menu of the plurality of target resources.

According to a disclosed embodiment, the selectable menu of the plurality of target resources may comprise icons and identifying data associated with the plurality of target resources.

According to a disclosed embodiment, the authentication of the client may be performed according to at least one of: OpenID or Security Assertion Markup Language.

According to a disclosed embodiment, the connection agent may be located in a local network in which the target resource is also located.

According to a disclosed embodiment, the connection agent may be located in a virtualized network in which the target resource is also located.

The disclosed embodiments also describe non-transitory computer readable media, systems, and methods for detecting and addressing security risks in remote native access sessions. For example, in one embodiment, a non-transitory computer readable medium may include instructions that, when executed by at least one processor, cause the at least one processor to perform operations for detecting and addressing security risks in remote native access sessions. The operations may comprise identifying a remote native access session between a client and a target resource; identifying connection data associated with the remote native access session obtained by a connection agent, wherein the connection data originates from the client and from a mobile device associated with a user, and comprises data indicative of at least one of: hardware of the client or mobile device, configuration settings of the client or mobile device, and network connection attributes of the client or mobile device; comparing a first portion of the connection data associated with the client with a second portion of the connection data associated with the mobile device; determining, based on the comparing, a security risk associated with the remote native access session; and initiating, based on the determined security risk, a security response operation.

According to a disclosed embodiment, initiating the security response operation includes sending an identification of the security risk to a network security platform.

According to a disclosed embodiment, initiating the security response operation includes performing the security response operation in the remote native access session.

According to a disclosed embodiment, the security response operation includes at least one of: suspending or terminating the remote native access session.

According to a disclosed embodiment, the security response operation includes at least one of: limiting network rights of the client or limiting local rights of the client.

According to a disclosed embodiment, the security response operation includes at least one of: generating an alert, making an audit record, or generating a report.

According to a disclosed embodiment, the security response operation includes at least one of: requesting authorization from an administrator or requesting authentication from the client.

According to a disclosed embodiment, the connection agent is configured to intercept the connection data.

According to a disclosed embodiment, the connection agent is configured to transmit the connection data to a security service that performs the comparing.

According to a disclosed embodiment, the connection data includes handshake data associated with the remote native access session.

According to another disclosed embodiment, there may be a computer-implemented method for detecting and addressing security risks in remote native access sessions. The method may comprise identifying a remote native access session between a client and a target resource; identifying connection data associated with the remote native access session obtained by a connection agent, wherein the connection data originates from the client and from a mobile device associated with a user, and comprises data indicative of at least one of: hardware of the client or mobile device, configuration settings of the client or mobile device, and network connection attributes of the client or mobile device; comparing a first portion of the connection data associated with the client with a second portion of the connection data associated with the mobile device; determining, based on the comparing, a security risk associated with the remote native access session; and initiating, based on the determined security risk, a security response operation.

According to a disclosed embodiment, the security risk is determined as a probability or score, and wherein the first portion and second portion of the connection data each have corresponding weights.

According to a disclosed embodiment, the security risk is determined based on a difference in time zone between the client and the mobile device.

According to a disclosed embodiment, the security risk is determined based on a difference in geographic location between the client and the mobile device.

According to a disclosed embodiment, the security risk is determined based on a difference in keyboard type between the client and the mobile device.

According to a disclosed embodiment, the security risk is determined based on a difference in network address information between the client and the mobile device.

According to a disclosed embodiment, the security risk is determined based on a difference in a software setting between the client and the mobile device.

According to a disclosed embodiment, the security risk is determined based on a behavioral profile developed for the client or the mobile device.

According to a disclosed embodiment, the connection data further comprises sensor data from the client or the mobile device.

According to a disclosed embodiment, the sensor data indicates detected motion.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor (s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings:

FIG. 5 is a flowchart depicting an example process for securely establishing secretless and remote native access sessions, consistent with the disclosed embodiments.

DETAILED DESCRIPTION

Figure 1:
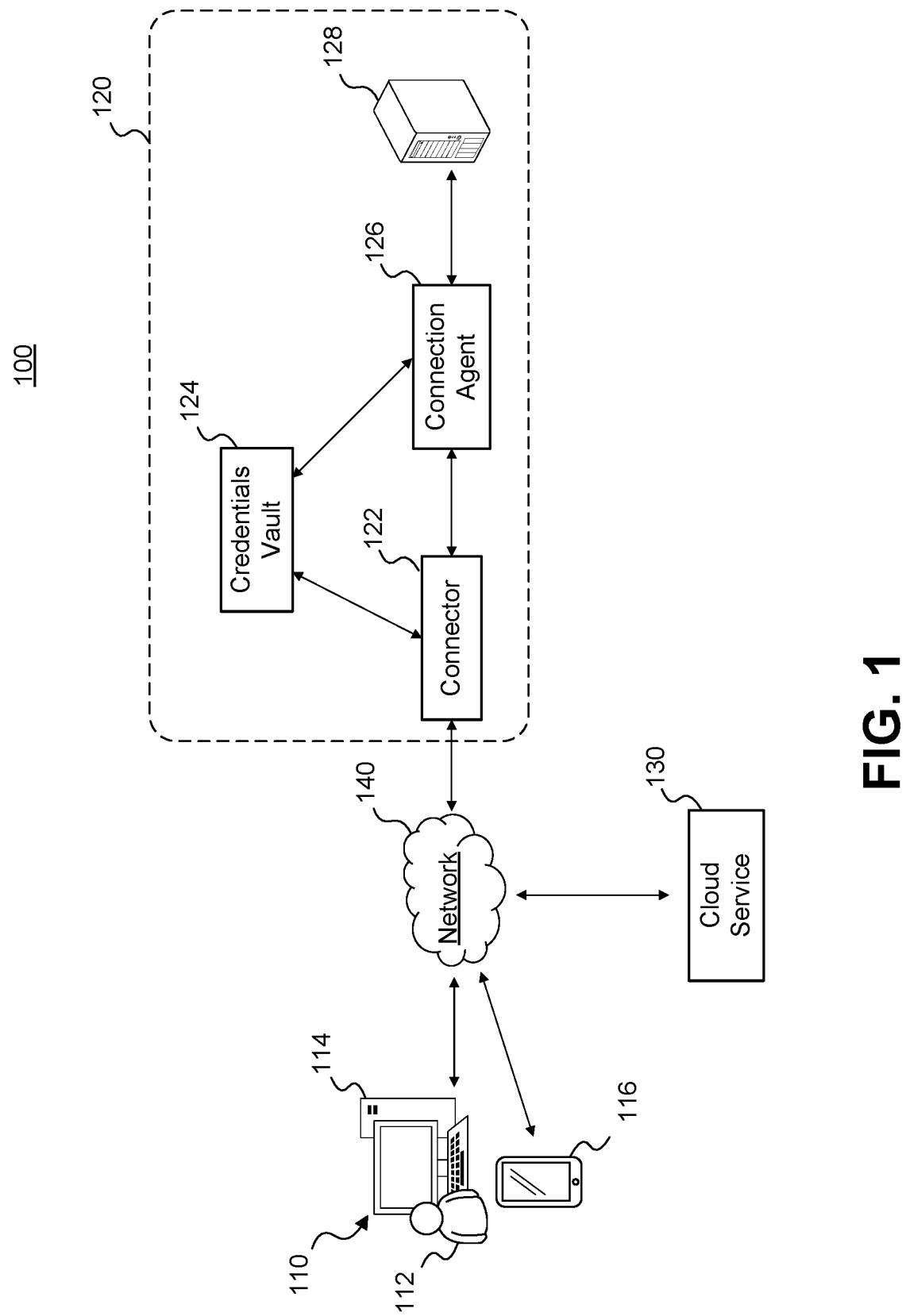
FIG. 1 illustrates an example system environment for providing native remote access to target resources, consistent with the disclosed embodiments.

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

The techniques for securely establishing secretless and remote native access sessions described herein overcome several technological problems relating to security, efficiency, and functionality in the fields of cybersecurity and remote network access. In particular, the disclosed embodiments provide techniques for establishing secure remote access sessions in a passwordless manner using native desktop clients. As discussed above, many current remote access techniques present security vulnerabilities and inefficiencies both for users and for organizations. For example, virtual private networks (VPNs) and other connections often create attack vectors for malicious actors. In particular, VPN and other clients often use credentials, such as passwords, when establishing the connection, which may unnecessarily expose these credentials to attackers. Similarly, some techniques include sensitive information about the client or the host network in communications establishing the connection, which may also create vulnerabilities. Further, VPN clients and other techniques often allow broad access to a network, which may increase the ability of attackers to access sensitive information or escalate privileges in the network.

The disclosed embodiments provide technical solutions to these and other problems with current techniques. In particular, the disclosed techniques do not require passwords or other credentials to be stored on the client device, or to be transmitted by the client to the target network system, thereby improving security in the network. Further, the disclosed techniques allow a remote access session to be established without identifying a particular target resource and without transmitting usernames or other sensitive information associated with the client during the connection phase. Rather, this information may be provided after the connection has been established and once a user has been authenticated. Moreover, the scope of access that a user may be granted can be narrowly tailored based on permissions associated with the user or the current access requirements of the user. For these, and other reasons that will be apparent to those skilled in the art, the disclosed techniques provide improved security over existing techniques.

Further, the disclosed techniques do not require a dedicated agent or client to be installed on a client device for establishing the secure connection other than software components that are native to the device and/or the operating system. For example, the remote access may be established using a standard remote desktop protocol, without the need for a VPN client, a web-based portal, or other non-native software. This not only improves the experience for the user, but can provide increased flexibility in the types of devices that can access the network, and can also reduce overhead costs associated with maintenance and troubleshooting of a dedicated client.

The disclosed techniques also solve technological problems in the areas of detection of malicious activity and identifying anomalous activity. As discussed further below, a wide variety of data may be collected from a connection session (e.g., an RDP session). This data may come from the connection session itself, or from the user's computing device (e.g., mobile device, computer, etc.). The data may then be used to uniquely profile individual users and their activity. If an anomaly is detected between a user's regular or typical activity and observed activity, an inference about potentially malicious or problematic activity may be made. As discussed below, based on this determination various security control operations may be performed, such as closing the remote session, limiting a number of permitted remote sessions for a user, triggering an alert, recording or auditing data associated with the session, commencing a video recording of the session or a user, or various other operations.

Reference will now be made in detail to the disclosed embodiments, examples of which are illustrated in the accompanying drawings.

FIG. 1 illustrates an example system environment 100 for providing native remote access to target resources, consistent with the disclosed embodiments. System environment 100 may include one or more client identities 110, one or more mobile devices 116, a client system 120, and one or more cloud services 130, as shown in FIG. 1. Client system 120 may comprise, among other things, a connector 122, a credentials vault 124, a connection agent 126, and one or more target resources 128. System environment 100 may represent a system or network environment in which client identity 110 requests access to target resource 128 remotely. System environment 100 may be configured to provide client identity 110 access to target resource 128 using native web applications (i.e., without requiring a dedicated application, webpage, etc.) and without requiring separate credentials. Further details regarding this system are provided below.

The various components of system 100 may communicate over a network 140. Such communications may take place across various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth, infrared, etc.), or various other types of network communications. In some embodiments, the communications may take place across one or more of these forms of networks and protocols. While system environment 100 is shown as a network-based environment, it is understood that in some embodiments, one or more aspects of the disclosed systems and methods may also be used in a localized system, with one or more of the components communicating directly with each other.

Client identity 110 may refer to any identity that may access files associated with target resource 128. In some embodiments, client identity 110 may refer to a particular user or account (e.g., data and/or instructions representing an individual or service account). For example, client identity 110 may include a user 112 associated with one or more credentials for accessing target resource 128. In some embodiments, client identity 110 may include a client device 114 through which user 112 may access target resource 128. For example, client device 114 may be a personal computer (e.g., a desktop or laptop computer), a mobile device (e.g., a mobile phone or tablet), a wearable device (e.g., a smart watch, smart jewelry, implantable device, fitness tracker, smart clothing, head-mounted display, etc.), an IoT device (e.g., smart home devices, industrial devices, etc.), or any other device that may engage in remote access to target resource 128. In some embodiments, client identity 110 may be a virtual machine (e.g., based on AWS™, Azure™ IBM Cloud™, etc.), container instance (e.g., Docker™ container, Java™ container, Windows Server™ container, etc.), or other virtualized instance. In some embodiments, client identity 110 may be a software instance or application executing on client device 114. Using the disclosed methods, client identity 110 may access target resource 128 remotely without the need for specific credentials, a VPN, a dedicated agent, etc. As used herein, a "client" may refer collectively to client identity 110, to user 112, an account associated with user 112, or to client device 114.

In some embodiments, client identity 110 may be authorized through system environment 100 using a multi-factor authentication process. This may include authenticating client identity 110, at least in part, through verifying an object in the possession of user 112. Accordingly, system environment 100 may further include a device, such as mobile device 116, for authenticating client identity 110. Mobile device 116 may include any computing device associated with user 112 that is separate from client device 114. For example, mobile device 116 may include a mobile phone, a tablet, a wearable device (e.g., a smart watch, smart jewelry, implantable device, fitness tracker, smart clothing, head-mounted display, etc.). In some embodiments, mobile device 116 may be configured to receive push notifications or other electronic communications requesting authentication of client identity 110. Further, mobile device 116 may include a display configured to display graphical user interfaces for selecting accounts and/or target resources, or performing other functions associated with the disclosed techniques.

Client identity 110 and/or mobile device 116 may communicate with client system 120 through network 140. Client identity 110 may be configured to participate in remote native access sessions with client system 120 for accessing target resource 128. As used herein, a remote native access session may refer to any network-based remote connection that is accessed through native software and components of the client device 114. In some embodiments, the remote native access session may be a remote desktop connection. Accordingly, the native software may include a remote desktop client that is not specific to client system 120 or cloud service 130. For example, the remote desktop client may include a client integral to an operating system of client device 114, such as a Microsoft™ remote desktop protocol (RDP) client, or similar RDP clients. Accordingly, the remote native access session may be accessed without the need for a dedicated client (e.g., a VPN client), a webpage browser (e.g., through a web portal, an HTML5 gateway, etc.), or the like.

Further, the remote native access session may be dynamic. As used herein, a dynamic connection may be one that is established without initially identifying one or more aspects of the remote access connection. For example, during the connection phase, the account accessing the connection, the target resource (e.g., the target IP address, etc.), the connecting tool (e.g., which application is used), or various other aspects may not be defined. Rather, these or other aspects may be defined after the connection has been established, and potentially after the client identity has been authenticated. In some embodiments, user 112 may specify these aspects over the native connection using client device 114, mobile device 116, or through other methods. Additional details regarding the remote native access session are described below with respect to FIG. 3.

As shown in FIG. 1, client system 120 may include a connector 122. Connector 122 may be a component of client system 120 responsible for receiving requests for remote access sessions. Connector 122 may process these requests and perform additional interfacing steps between client device 114, mobile device 116, cloud service 130, and/or components of client system 120. Connector 122 may be a dedicated server, service, or software component of client system 120, or may be integrated with one or more other components of client system 120.

In some embodiments, client system 120 may further include, or have external access to, a credentials vault 124. Credentials vault 124 may be any form of storage location containing credentials (such as usernames, tokens, passwords, etc.) associated with client system 120 (e.g., CyberArk Enterprise Password Vault™). In particular, credentials vault 124 may store credentials required to access target resource 128. For example, as discussed further below, in situations where client identity 110 has been successfully authenticated, connector 122 and/or connection agent 126 may fetch a secret (e.g., authentication key, credential, token, password, etc.) from credentials vault 124 for authentication of client identity 110 (or a corresponding identity or account) to the appropriate target resource 128. In some embodiments the secrets stored within credentials vault 124 may not be provided to client identity 110. Accordingly, user 112 may be authenticated in a passwordless manner to access target resource 128. In some embodiments, credentials vault 124 may be omitted and the credentials may be stored locally in client system 120, on client device 114 or mobile device 116.

Client system 120 may further include a connection agent 126, as shown in FIG. 1. Connection agent 126 may be a separate component (e.g., a separate software component, a separate server, etc.) or may be integrated with one or more other components of client system 120, such as connector 122. Connection agent 126 may perform tasks associated with establishing a remote access session as described above. Connection agent 126 may further obtain credentials for client identity 110, for example through credentials vault 124. Additional details regarding these and other actions that may be performed by connection agent 126 are provided below with respect to FIG. 3.

Client system 120 may further include, or have external access to, a target resource 128. As used herein, a target resource may refer to any resource within a network that may accessed by client system 120 remotely. Examples of network resources may include SQL servers, databases or data structures holding confidential information, restricted-use applications, operating system directory services, access-restricted cloud-computing resources (e.g., an AWS™ or Azure™ server), sensitive IoT equipment (e.g., physical access control devices, video surveillance equipment, etc.), and/or any other computer-based equipment or software that may be accessible over a network.

In some embodiments, target resource 128 may be a privileged resource, such that access may be limited or restricted. For example, access to the requested resource may require a privileged credential (e.g., a password, a username, an SSH key, an asymmetric key, a security or access token, etc.), membership in a privileged access group (e.g., Microsoft Active Directory™ group, AWS Identity and Access Management™ group, etc.), or other form of privileged access rights. In some embodiments, credentials vault 124 may store privileged credentials required for accessing target resource 128, as described above.

In some embodiments, system environment 100 may include a cloud service 130, as shown in FIG. 1. Cloud service 130 may be a cloud-based service configured to perform tasks associated with facilitating the connection between client device 114 (and/or mobile device 116) and client system 120. For example, cloud service 130 may be configured to receive or intercept access requests from client device 114 and may route them to connector 122. Additional details regarding these and other actions that may be performed by service 130 are described below with respect to FIG. 3.

Figure 2:
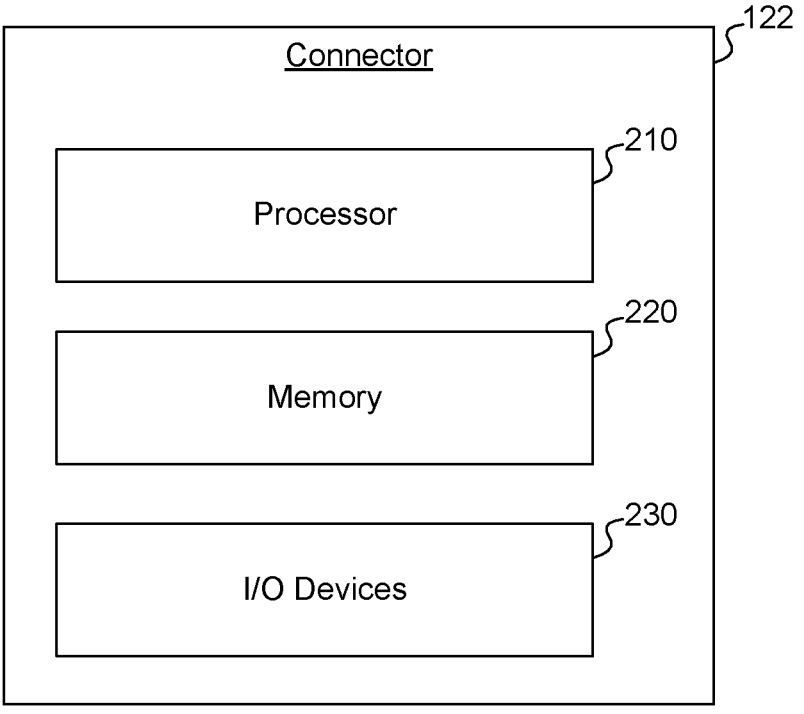
FIG. 2 is a block diagram showing an example computing system, consistent with the disclosed embodiments.

FIG. 2 is a block diagram showing an example connector 122, consistent with the disclosed embodiments. As described above, connector 122 may be a computing device (e.g., a server, etc.) and may include one or more dedicated processors and/or memories. For example, connector 122 may include a processor (or multiple processors) 210, a memory (or multiple memories) 220, and/or one or more input/output (I/O) devices 230, as shown in FIG. 2. In some embodiments, connector 122 may be integrated with one or more other components of client system 120. For example, processor 210 and/or memory 220 may also be associated with credentials vault 124, connection agent 126, and/or target resource 128.

Processor 210 may take the form of, but is not limited to, a microprocessor, embedded processor, or the like, or may be integrated in a system on a chip (SoC). Furthermore, according to some embodiments, processor 210 may be from the family of processors manufactured by Intel®, AMD®, Qualcomm®, Apple®, NVIDIA®, or the like. The processor 210 may also be based on the ARM architecture, a mobile processor, or a graphics processing unit, etc. The disclosed embodiments are not limited to any type of processor configured in client system 120.

Memory 220 may include one or more storage devices configured to store instructions used by the processor 210 to perform functions related to client system 120. The disclosed embodiments are not limited to particular software programs or devices configured to perform dedicated tasks. For example, the memory 220 may store a single program, such as a user-level application, that performs the functions associated with the disclosed embodiments, or may comprise multiple software programs. Additionally, the processor 210 may, in some embodiments, execute one or more programs (or portions thereof) remotely located from connector 122. Furthermore, memory 220 may include one or more storage devices configured to store data for use by the programs. Memory 220 may include, but is not limited to a hard drive, a solid state drive, a CD-ROM drive, a peripheral storage device (e.g., an external hard drive, a USB drive, etc.), a database, a network drive, a cloud storage device, or any other storage device.

I/O devices 230 may include one or more network adaptors or communication devices and/or interfaces (e.g., WIFI, BLUETOOTH, RFID, NFC, RF, infrared, Ethernet, etc.) to communicate with other machines and devices, such as with other components of system environment 100 through network 140. For example, client system 120 may use a network adaptor to receive and transmit communications pertaining to access requests within system environment 100. In some embodiments, I/O devices 230 may also include interface devices for interfacing with a user of client system 120. For example, I/O devices 230 may comprise a display, touchscreen, keyboard, mouse, trackball, touch pad, stylus, printer, or the like, configured to allow a user to interact with client system 120.

Figure 3:
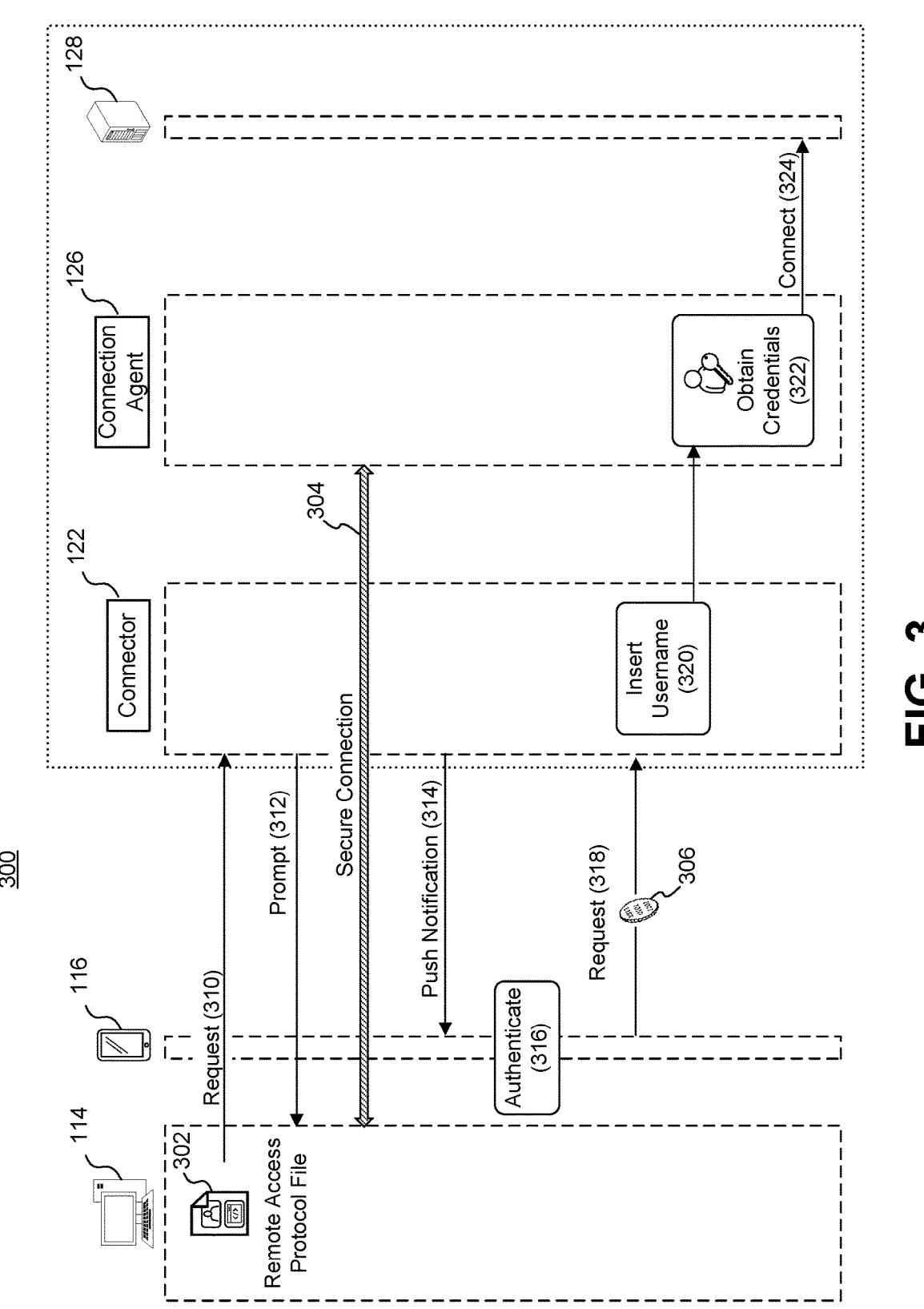
FIG. 3 is a block diagram illustrating an example process for providing native remote access to target resources, consistent with the disclosed embodiments.

FIG. 3 is a block diagram illustrating an example process 300 for providing native remote access to target resources, consistent with the disclosed embodiments. Process 300 may allow a client, such as client identity 110, to establish a secure connection 304 with client system 120 for accessing target resource 128. As used herein, accessing the target resource 128 may include any operations by a client device involving data or information stored on target resource 128. For example, this may include reading information stored on target resource 128, storing information on target resource 128, deleting or modifying information on target resource 128, or any other forms of operations requiring access to the target resource. In some embodiments, access may be restricted to privileged client identities, as discussed above.

As part of process 300, client device 114 may transmit a request in step 310 for accessing target resource 128 of client system 120. In some embodiments, client device 114 may access a remote access protocol file 302. This remote access protocol file 302 may include information for establishing secure connection 304. In particular, remote access protocol file 302 may include information identifying client identity 110 (e.g., an account associated with user 112, etc.) and information identifying a target host for the connection (e.g., connector 122, credentials vault 124, and/or connection agent 126). For example, this information may be represented as an address for a target host, which may include a server name indication (SNI) as part of a transport layer security (TLS) protocol, or any other suitable form of address. In some embodiments, remote access protocol file 302 may be a proprietary protocol file, such as a remote desktop protocol (RDP) file associated with Windows Remote Desktop™, or the like. Of course, remote access protocol file 302 may correspond to other protocols as well. Accordingly, client device 114 may send the request in step 310 using native remote access software, without the need for a VPN client, a browser-based interface, or other non-native software.

In the example of an SNI address, the remote access protocol file 302 may be presented in the form userID.address, where userID is a prefix added to the target host address. In some embodiments, the user ID may be a personal telephone number (e.g., mobile number), or other identifier associated with user 112. In some embodiments, process 300 may include a step of modifying the address within remote access protocol file 302 to include the user ID. For example, user 112 may manually modify the address to include a phone number or other identifier associated with user 112 through a text-based file editor, a graphical user interface, a mobile application, or any other suitable interface. In other embodiments, the user ID may be automatically added, for example, by client device 114, by cloud service 130, or other components of system environment 100. While the userID.address format is provided by way of example, any other suitable formats may be used for representing the user information and the address within remote access protocol file 302. For example, the user ID may be included in a designated field, appended as a suffix to the address, or otherwise included in the file.

Notably, in some embodiments, remote access protocol file 302 and the request of step 310 may not include credentials required to access target resource 128 and may not specifically identify target resource 128. In such embodiments, secure connection 304 may be dynamic in that the connection may be established initially and the details regarding the specific target resource and the user's credentials may be determined subsequently, as described further below. For example, remote access protocol file 302 may include fields or designated spaces for a username and password or other credentials of client identity 110. These fields or spaces may be empty, may include a default text (e.g., "BLANK"), or may include an identifier for identifying the credential fields in later stages. Omitting the user's credentials in this way may improve security by eliminating a potential for the user's credentials to be stolen or otherwise obtained by an attacker. Further, process 300 would not require user 112 to enter separate credentials for accessing client system 120. Thus process 300 allows for a password-less remote connection to target resource 128. Additional details regarding the authentication of client identity 110 are provided below.

Remote access protocol file 302 may be accessed by client identity 110 in various ways. For example, remote access protocol file 302 may be stored in a memory of client device 114, such as on a local hard drive, a solid state drive, a removable drive, or the like. In some embodiments, remote access protocol file 302 may be stored externally. For example, remote access protocol file 302 may be stored on a cloud-based platform (e.g., in cloud service 130, or other cloud locations), on a remote server, on a separate computing device, or the like. In some embodiments, cloud service 130 may generate remote access protocol file 302 and provide it to client identity 110 for accessing client system 120 and/or other systems.

In some embodiments, the request in step 310 may not be transmitted directly to connector 122. For example, user device 114 may transmit the request to cloud service 130, which may route the request to the correct target host based on the address included in remote access protocol file 302. This may include, for example, extracting the SNI address described above and mapping it to the appropriate connector. Accordingly, cloud service 130 may include or may have access to a database of connector network addresses, connector identifiers, and/or other information to facilitate routing requests in step 310.

In step 312, connector 122 may send a prompt to client device 114 to establish a secure connection 304 with connection agent 126. For example, secure connection 304 may be a tunnel connection, such as a connection using the TLS protocol, or a similar connection protocol. While TLS is used by way of example, it is to be understood that various other forms of secure connections may be used, and the present disclosure is not limited to any particular connection protocol or configuration. Further, while secure connection 304 is shown between client device 116 and connection agent 116, the connection may be with any component or subcomponent of client system 120, including connector 122.

Once the connection has been successfully tunneled, connector 122 may generate and send a push notification in step 314. The push notification may be received through a mobile application on mobile device 116. Through the push notification, user 112 may be prompted for authentication and target account selection. Authentication step 316 may occur in a variety of ways. In some embodiments, authentication may occur by virtue of user 112 having mobile device 116 in his or her possession. Accordingly, the push notification transmitted in step 314, along with the identification of the user in the request in step 310, may provide multi-factor authentication for client identity 110. In some embodiments, additional authentication may be performed, such as biometric authentication (e.g., a retinal scan, facial recognition, a fingerprint scan, a voiceprint identification, etc.), a user pin, a password, scanning a QR code, or the like. According to some embodiments of the present disclosure, an authentication protocol, such as OpenID or Security Assertion Markup Language (SAML), may be used in step 316.

Through mobile device 116, user 112 may also select an account for accessing target resource 128. In some embodiments, the account may be selected automatically. For example, user 112 may be associated with only one account, or may have a preferred or default account that is selected. In other embodiments, user 112 may select from a plurality of accounts through a user interface.

Figure 4:
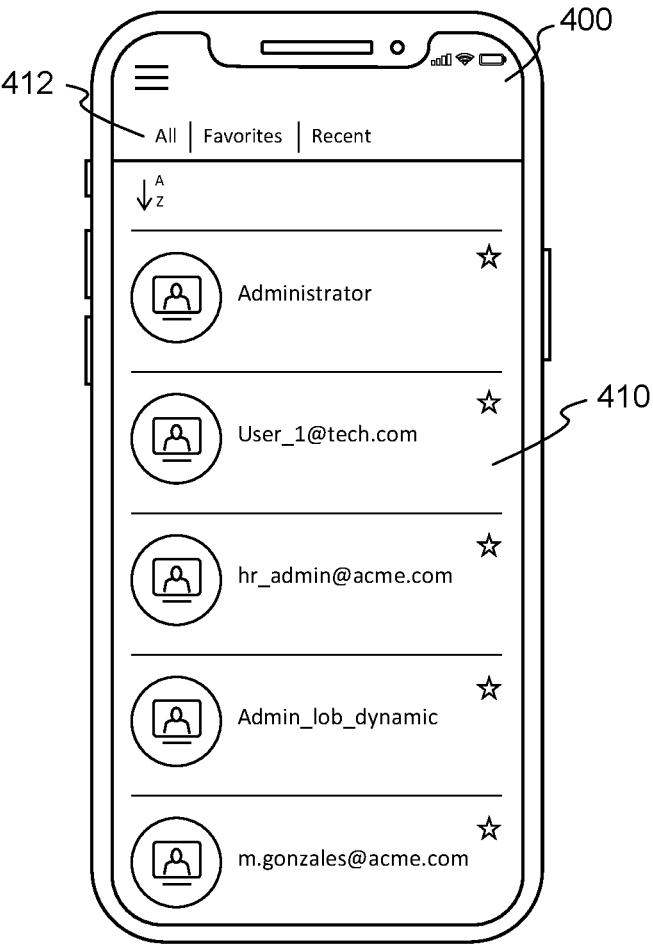
FIG. 4 illustrates an example user interface for selecting an account, consistent with the disclosed embodiments.

FIG. 4 illustrates an example user interface 400 for selecting an account, consistent with the disclosed embodiments. User interface 400 may be displayed, for example, on mobile device 116 and may be associated with a mobile application. As shown in FIG. 4, user interface 400 may present a plurality of accounts, such as account 410, that the user may select through the display of mobile device 116. User interface 400 may further include filters or other options for configuring the display of the available accounts. For example, user interface 400 may include filters 412 for filtering or sorting by accounts designated as favorites, recent accounts selected by user 112, or various other attributes. User interface 400 is shown by way of example, and various other configurations or formats may be used. In some embodiments, the user interface 400 may be presented through a separate device, such as client device 114, or another device accessible by user 114 (e.g., a laptop computer, a tablet, a smartwatch, etc.).

Returning to FIG. 3, process 300 may include a step 318 for transmitting a request to connector 112 for accessing target resource 128. This request may include a token 306, that is provided to connector 122. In some embodiments, token 306 may be a temporary token generated by mobile device 116 for one-time access to client system 120. In some embodiments, token 306 may be generated by another device or service, such as cloud service 130. In some aspects of the present disclosure, token 306 may further be valid only for a limited period of time.

Token 306 may include an identifier of target resource 128. For example, client system 120 may include a plurality of target resources associated with target identity information, and token 306 may identify target resource 128 from among the plurality of target resources. The target identity information may be stored locally within client system 120 (e.g., in memory 220) or in an external storage location (e.g., a remote server, a cloud-based platform, etc.).

In step 320, connector 122 may then modify the request to include a username based on token 306. In some embodiments, this may include intervening in the remote desktop protocol to replace the remote desktop username in the request of step 310 with token 306. For example, as described above, remote access protocol file 302 may include a username field that is blank, or that has a placeholder or default value. Accordingly, step 320 may include inserting the blank username or replacing the placeholder with token 306, which will serve as the username for accessing target resource 128. Therefore, the connection may be established initially without requiring the username to be included in the request of step 310.

In step 322, connection agent 126 may receive credentials associated with token 306. In some embodiments, the credentials may be received from credentials vault 124. For example, connection agent 126 may receive token 306 and may use token 306 to retrieve credentials corresponding to account 410 selected by user 112. Connection agent 126 may then assert the retrieved credentials at target resource 128 on behalf of client identity 110, as shown in step 324. Accordingly, client identity 110 may access target resource 128 without receiving the credentials from credentials vault 130, which may reduce security vulnerabilities in system environment 110 by preventing them from being exposed to attackers. Further, a separate password is not required for accessing target resource 128 through the remote access protocol used by client device 114. Access can also be granted without the need for a dedicated client, such as a VPN client, a browser-based interface, or other non-native system components.

In some embodiments, steps 322 and 324 may be performed without connection agent 126. For example, connector 122 may access the credentials of step 322 directly from credentials vault 124, without connection agent 126, and may further assert the credentials on behalf of client identity 110. In some embodiments, the credentials may not be retrieved by connector 122 or connection agent 126, but may be provided by client device 114. For example, the credentials may be stored locally (e.g., in a cache, etc.) on client device 114. In some embodiments, client identity 110 may receive the credentials after they are obtained in step 322. For example, after step 322, connection agent 126 and/or connector 122 may transmit the obtained credentials to client device 114 and/or mobile device 116.

FIG. 5 is a flowchart depicting an example process 500 for securely establishing secretless and remote native access sessions, consistent with the disclosed embodiments. Process 500 may be performed by at least one processing device, such as processor 210 of connector 122, as described above. It is to be understood that throughout the present disclosure, the term "processor" is used as a shorthand for "at least one processor." In other words, a processor may include one or more structures that perform logic operations whether such structures are collocated, connected, or disbursed. In some embodiments, a non-transitory computer readable medium may contain instructions that when executed by a processor cause the processor to perform process 500. Further, process 500 is not necessarily limited to the steps shown in FIG. 5, and any steps or processes of the various embodiments described throughout the present disclosure may also be included in process 500, including those described above with respect to FIG. 3.

In step 510, process 500 may include identifying a client configured to participate in remote native access sessions. For example, step 510 may identify client identity 110 and thus the client may include user 112, an account associated with user 112, and/or client device 114. The client may be identified in various ways. In some embodiments, the client may be identified based on a request received from client device 114, as shown in step 310 of FIG. 3. In some embodiments, the client may have a remote access protocol file that has been modified to include an identifier associated with the client. For example, the client may access remote access protocol file 302, as discussed above, which may have been modified to include at least one of a mobile telephone number, an email address, a user name, an account name, a custom identifier created by the client, a random or semi-random identifier, a customer number, an IP address, or various other identifiers that may be associated with the client. The remote access protocol file 302 may be modified by the client or may be modified by other components of system environment 100, including cloud service 130. In some embodiments, the client may be identified by cloud service 130 as described above. For example, cloud service 130 may extract an address (e.g., an SNI indicating a hostname) from a request from client identity 110 and may route the request based on the address. In some embodiments, the remote access protocol file 302 may comply with a remote desktop protocol, as described above.

In step 520, process 500 may include sending a prompt to the client to establish a secure tunnel connection with a connection agent using the identifier associated with the client. For example, step 520 may correspond to step 312 for establishing secure connection 304 with connection agent 126, as described above with respect to FIG. 3. The secure tunnel connection may include any form of secure connection according to a tunneling protocol, including, but not limited to TLS, IP in IPv4/IPv6, Generic Routing Encapsulation (GRE), Secure Socket Tunneling Protocol (STTP), Internet Protocl Security (IPSec), Layer 2 Tunneling Protocol (L2TP), Virtual Extensible Local Area Network (VXLAN), or the like. As shown in FIG. 1, connection agent 126 and target resource 128 may be included in the same client system 120. Accordingly, the connection agent may be located in a local network, a virtual network, or other form of network in which the target resource 128 is also located.

In step 530, process 500 may include authenticating the client, which may be performed in various ways. For example, authentication of the client may be performed according to at least one of OpenID, SAML, or similar authentication protocols. In some embodiments, step 530 may include sending a push notification to a mobile device associated with the client. For example, mobile device 116 may receive a push notification as shown in step 314 and described above. Accordingly, the mobile device 116 may be configured to authenticate the client through an application on mobile device 116.

In step 540, process 500 may include accessing target identity information associated with one or more target resources. For example, client system 120 may include a plurality of target resources, including target resource 128, each which may be associated with target identity informa- tion. This target identity information may be stored, for example, in a database, a memory device (e.g., memory device 220), on a remote server or cloud-storage platform, or various other storage locations. In some embodiments, the plurality of target resources may be identified based on the identified client. For example, the plurality of target resources are identified based on access rights of the client, or based on the authentication of the client.

In step 550, process 500 may include receiving from the client a token that identifies a target resource from among the one or more target resources. For example, step 550 may include receiving token 306, as described above with respect to FIG. 3. In some embodiments, the target resource 128 may be selected by a user. Accordingly, process 500 may further include receiving a selection by the client of the target resource 128 from among the plurality of target resources. In some embodiments, the selection may be made through a graphical user interface, similar to user interface 400 shown in FIG. 4. For example, process 500 may further comprise sending to the client data for generating a select- able menu of the plurality of target resources. The selectable menu of the plurality of target resources comprises icons and identifying data associated with the plurality of target resources.

In step 560, process 500 may include obtaining, based on the token, a credential required for secure access to the target resource. For example, step 560 may comprise obtaining credentials associated with the target resource 128 identified in the token. As described above with respect to FIG. 3, the credential may be obtained from a secure credentials vault, such as credentials vault 124. Accordingly, the credential may be obtained without making the credential available to the client. In other embodiments, the credential may be obtained locally at the client, and deleted at the client upon termination of the remote native access session. As described above with respect to step 322, in some embodi- ments, the credential may be obtained in a secretless manner from the perspective of the client. Accordingly, the client may not be required to submit the credential or other credentials for accessing the target resource 128. In some embodiments, process 500 may further include replacing a username in a request for the remote native access session with data from the token. For example, process 500 may include inserting the token or data from the token into the remote access protocol file associated with the client. Alter- natively, this may be performed by connection agent 126, or other components of client system 120.

At step 570, process 500 may include initiating, using the credential, a remote native access session between the client and the target resource. Accordingly, process 500 may allow the client to access the target resource in a passwordless manner (and without requiring transmission of other forms of secure credentials) and may be done through native remote protocol software (e.g., without requiring a separate agent or non-native software). As discussed above, the remote native access session may comply with various different remote access protocols and techniques.

Consistent with above embodiments, additional disclosed embodiments relate to detecting and addressing security risks in remote native access sessions. Such embodiments are discussed in connection with FIG. 6 and process 600, as detailed further below.

In some embodiments, a security system (e.g., cloud service 130 or connector 122) may be an entity conducting a security assessment and may detect and address security risks in remote native access sessions. The system may collect or receive connection data from a user device (e.g., devices 110, 112, or 114), from connector 122, or from target resource 128. The data may include, for example, an RDP version, desktop information (e.g., width or physical width, height or physical height, color depth, high color depth, supported color depths, orientation, desktop scale factor, device scale factor, etc.), keyboard information (e.g., layout, type, subtype, function key, file name, etc.), client informa- tion (e.g., client hostname, software information, build, product ID, serial number, etc.), security data (e.g., encryp- tion methods being used or configured, etc.), network data (e.g., RDP channels requested by the client, etc.), monitor data (e.g., resolution, orientation, etc.), client information (e.g., address family, client address, MAC address, RDP client directory, session ID, flag settings, etc.), time zone information (e.g., time zone, time zone key name, daylight savings data, etc.), sensor data (e.g., from a pedometer, GPS, gyroscope, etc.), and various other types of data. Based on this data, unique profiles may be developed for individual clients or identities, reflecting how they typically or fre- quently engage in remote access sessions and using what devices. In some embodiments, if the system detects an anomaly or a security threat, the system may prompt the user or an administrator with a security notification (e.g., "change your password" or "your session may be dangerous" or the like). Alternatively or additionally, the system may provide a security notification describing the threat incident to an administer or prompt a security center with a notification about the incident (e.g., "a threat is detected, "malicious connection is being made," or "your organization is under attack" or the like).

Other risks identified by the system may take a variety of forms. For example, if a user connecting from an endpoint machine (e.g., endpoint 110 or 114) is in one time zone, but their mobile device (e.g., mobile device 116) is in another time zone, that may be determined to deviate from a typical or standard behavioral pattern for the user. Similarly, if the IP geolocation of the endpoint device does not match the IP geolocation of the mobile device, that may also be deemed anomalous. Likewise, if the endpoint and mobile device have different keyboard layouts (e.g., one in English and the other in Chinese), that may be determined to be anomalous. Additional examples of potentially anomalous activity that may be detected based on the collection session data include, as examples: the system expects both devices to be on a corporate network (WIFI or LAN) and have the same IP, but one has a different network address; the system detects in the RDP protocol mouse-clicks or keyboard presses from the endpoint, but also gets sensor input from the mobile device (e.g., pedometer or steps counter) indicating the user is walking (violating an assumption or determined pattern that a user usually should not be typing and walking at the same time); a user usually connects from an endpoint machine that has a certain amount of screens and screen resolution (this is data that is available in RDP), but then connects from an endpoint with a different screen configuration (considered to be more risky and may trigger an action), and various others.

In some embodiments, such detected anomalous activity may be assigned a weighted or unweighted risk score that may be added to a weight-based algorithm. For example, weights may be applied to certain types of data (e.g., IP address of client) that are determined to be more probative of anomalous activity than others (e.g., time of day). The combined risk score may affect the security mitigation and actions that may be applied on the session, as discussed further below. These techniques may advantageously be applied to various industries, including cyber security and financial fraud alerts, among others.

Further, in some embodiments, instead of mere access control, the system may scan a network to identify anomalies (e.g., look for suspicious actors even if the actors are not seeking access to a target). For example, on a continuous or periodic basis, the system may collect and analyze connection data for connected identities. This may be performed both for building behavioral profiles used in detecting anomalous activity, and in detecting anomalous activity itself.

In some embodiments, the system may detect anomalies by analyzing device activities, device location, and device settings. For example, the system may detect an anomaly when a user device or mobile device is determined to be doing something it does not typically do, when a user device is making a connection it does not typically make, when a user is walking faster than usual (e.g., tracked via the user device's pedometer or GPS), when a user and their device are in different locations, when a user or their user device are doing things that they're not supposed to do or they have not done in the past, when a user and their device have different networks or zones, when configuration settings are different than what the IT administrator pushed out, or when hardware configurations (e.g., monitor, other peripheral devices, keyboard, etc.) are different than expected (e.g., if the user device has a keyboard in English and an endpoint is connecting from a keyboard using a different language), etc. For example, the system may analyze a correlation between a user's mobile device and the specific data the system may have in some network protocols in order to make the determination of the anomaly.

Device activities may also be analyzed using sensor data from the hardware of the device (e.g., device 114 or 116). For example, if the system detects from a pedometer of a mobile device that the user is walking very fast or running, it would not make sense for the user to be performing a connection at that point. An activity like running while trying to perform a connection may raise an alert. Sitting on a train, though, may not raise an alert (measuring actual steps rather than velocity/acceleration).

Possible security mitigations or actions that may be invoked after a certain risk is identified or reached may take various forms. Examples include: closing or suspending the user's RDP session; limiting the number of RDP sessions that the user can open; triggering an alert to an administrator or security server; requiring an administrator or security server to approve the secretless connection before it starts; limiting the user's actions during the session to non-privileged actions; starting a video recording or keystroke logging of the session, or starting to record the RDP traffic for audit; disabling RDP capabilities such as clipboard, driving mapping or printer's redirection (so the user may not copy files or data from the target machine 128); and requiring an additional factor for the session to start (e.g., sending a one-time password to the user's phone or email). Various other security responses are possible as well.

In some embodiments, the system may be implemented in multiple locations. For example, the system may be implemented locally at the target 128; at the client or user itself (e.g., client device 114 of 116); or in the middle and acting as the connector 122.

Aspects of this disclosure may include identifying a remote native access session between a client and a target resource. As discussed above, a remote native access session may refer to any network-based remote connection that is accessed through native software and components of the client device 114 or 116 of FIG. 1. In some embodiments, the remote native access session may be a remote desktop (e.g., RDP or other) connection. Accordingly, the native software may include a remote desktop client (e.g., RDP or other client) that is not specific to client system 120 or cloud service 130 of FIG. 1. Further, the remote native access session may be dynamic. As used herein, a dynamic connection may be one that is established without initially identifying one or more aspects of the remote access connection. In some embodiments, the system may identify a remote native access session between client device 114 or 116 and target resource 128 via network 140 of FIG. 1, consistent with above embodiments.

Aspects of this disclosure may include identifying connection data associated with the remote native access session obtained by a connection agent (e.g., agent 126), wherein the connection data originates from the client (e.g., client 114) and/or from a mobile device (e.g., mobile device 116) associated with a user 112, and comprises data indicative of at least one of: hardware of the client or mobile device, configuration settings of the client or mobile device, and network connection attributes of the client or mobile device.

Identifying connection data associated with the remote native access session obtained by the connection agent 126 may occur in different places, as described above. The connection agent 126 may be at the client 114 or 116, in some embodiments, or separate as shown in FIG. 1. The connection agent 126 may also be at the target resource 128. Alternatively, the connection agent 126 may be at an intermediary location (e.g., proxy server or gateway) doing a proxying or intercepting function. Accordingly, the system may identify the connection data associated with the remote native access session through various techniques. Connection data may be data exchanged during the session and may include hardware data, hardware parameters, and various other types, as discussed above.

In some embodiments, the system identifies connection data obtained by a connection agent 126 somewhere, where the connection data originates from the client 114 and/or from a mobile device 116 associated with the user 112. Accordingly, the connection data may be derived from one or more different places and may be compared to each other. In some embodiments, the connection data is data indicative of at least one of: hardware of the client or mobile device, configuration settings of the client or mobile device, and network connection attributes of the client or mobile device. Thus, the connection data may include data from the client and the mobile device, but the data can be of these three different categories (hardware, configuration, and network) from the client or the mobile device. In other words, the system does not have to do a comparison on every type of data; the comparison may simply be one side that is available (e.g., compare the data from the mobile device and the client device).

In some embodiments, the system is not merely gathering data, but is further identifying data (e.g., connection data) from a remote native access (any data that may be available in this type of environment). This may occur by, for example, activity scanning a network environment for connections and connection data.

In some embodiments, there is a great deal of collectable and identifiable information that is passed from the endpoint machine through the RDP protocol (e.g., endpoint IP, time zone, keyboard layout, screen resolution, etc.), which may help profile a user 112's activity and assist in detecting malicious connections and anomalies. Further, there is information that may be collected and identified at the user's mobile device 116 during a session and that cross-referenced with endpoint machine information. Such information may include the mobile device's IP address, time zone, keyboard layout, etc. Based on this data and the correlation between the data collected from both user devices (e.g., mobile device and endpoint machine), the system may develop a risk engine that may invoke security mitigation mechanisms if some risk level is reached.

For example, with reference to FIG. 1, at cloud service 130, the system may receive data sent from the mobile device 116 to the cloud service 130. At connector 122, the system may intercept RDP messages sent from the endpoint machine 114.

In some embodiments, the following data may be collected from an endpoint using the RDP protocol:

| Message | Data type |
|---|---|
| Connect Initial PDU | clientCoreData - Core Data:<br>RDP Version<br>Desktop information:<br>  desktopWidth<br>  desktopHeight<br>  colorDepth<br>  postBeta2ColorDepth<br>  highColorDepth<br>  supportedColorDepths<br>  desktopPhysicalWidth<br>  desktopPhysicalHeight<br>  desktopOrientation<br>  desktopScaleFactor<br>  deviceScaleFactor<br>Keyboard information<br>  keyboardLayout<br>  keyboardType<br>  keyboardSubType<br>  keyboardFunctionKey<br>  imeFileName<br>Client info:<br>  clientName (client hostname)<br>  client software information<br>  clientBuild<br>  clientProductId<br>  serialNumber<br>  clientDigProductId<br>clientSecurityData - Security Data:<br>  Encryption methods - security-related information<br>  used to advertise client cryptographic support<br>clientNetworkData - Network Data:<br>  RDP channels requested by the client (channels<br>  for: clipboard, drives, etc.)<br>clientMonitorData\clientMonitorExtendedData<br>  Number of client machine monitors<br>  Resolution of monitors and\or orientation |
| Client Info PDU | TS INFO PACKET\TS EXTENDED INFO PACKET<br>Client network information:<br>  clientAddressFamily<br>  cbClientAddress<br>  clientAddress<br>Client OS information<br>  clientDir (RDP client directory)<br>  clientSessionId - the OS session id the user is<br>  connecting from performanceFlags<br>Time zone information:<br>  clientTimeZone<br>  dynamicDSTTimeZoneKeyName<br>  dynamicDSTTimeZoneKeyName<br>  dynamicDaylightTimeDisabled |

Further, TLS Client Hello messages may be saved as they contain data that can fingerprint the SSL library that the client may use for encrypting the session. Additionally, the following data may be collected and identified from a user mobile device 116: time zone, keyboard layout, IP address (which may be used for detecting the device geolocation), and sensor information (e.g., pedometer, GPS, gyroscope, etc.).

In some embodiments, the connection agent 126 is configured to intercept the connection data. Further, in some embodiments, the connection agent 126 is configured to transmit the connection data to a security service (e.g., cloud service 130) that performs the comparing. Additionally, in some embodiments, the connection data includes handshake data associated with the remote native access session. In such embodiments, handshake data may include negotiation of encryption methods (SSL negotiation).

Aspects of this disclosure may include comparing a first portion of the connection data associated with the client with a second portion of the connection data associated with the mobile device 116. In some embodiments, the system may compare a first portion of the connection data associated with the client with a second portion associated with the mobile device. At least some of what the system has previously collected from the user mobile device 116 and at least some of what the system has previously collected from the client device 114 may be compared. Then, based on the comparisons, the system may determine comparative security risk associated with the remote native access session.

In some embodiments, the system has a universe of data that it may identify and analyze (e.g., connection data). Comparing of the connection data does not need to be based on all of the connection data in every situation. The comparison instead may be based on only a portion (e.g., a first portion of the connection data associated with the client and a second portion associated with the mobile device).

Aspects of this disclosure may also include determining, based on the comparing, a security risk associated with the remote native access session. By way of one example, the system may compare a first portion of data associated with the client 114 and a second portion of data associated with a mobile device 116 and finally determine a security risk based on the comparison.

Aspects of this disclosure may further include initiating, based on the determined security risk, a security response operation. By way of one example, after determining a security risk (and it's level), the system may provide a security response operation such as a security notification (e.g., "change your password" or "your session may be dangerous," etc.) or a security notification describing the threat incident to an administer or prompt a security center with a notification about the incident (e.g., "a threat is detected, "malicious connection is being made," or "your organization is under attack," etc.).

In some embodiments, initiating the security response operation includes sending an identification of the security risk to a network security platform (e.g., cloud service 130). By way of one example, the system may forward a notification identifying the security risk to a network security platform.

In some embodiments, initiating the security response operation includes performing the security response operation in the remote native access session. By way of one example, the system may perform a security response operation in the remote native access session such as recording the user session in response to a risk being identified.

In some embodiments, the security response operation includes at least one of: suspending or terminating the remote native access session. By way of one example, the system may end the user's session in response to a risk being identified.

In some embodiments, the security response operation includes at least one of: limiting network rights of the client or limiting local rights of the client. By way of one example, the system may only allow the user to access certain areas and block off other areas in response to a risk being identified.

In some embodiments, the security response operation includes at least one of: generating an alert, making an audit record, or generating a report. By way of one example, the system may provide an alert message such as "your session has been compromised," etc., in response to a risk being identified.

In some embodiments, the security response operation includes at least one of: requesting authorization from an administrator or requesting authentication from the client. By way of one example, the system may ask a network administrator or security system (e.g., cloud service 130) to authenticate a user 112 in response a risk being identified.

Figure 6:
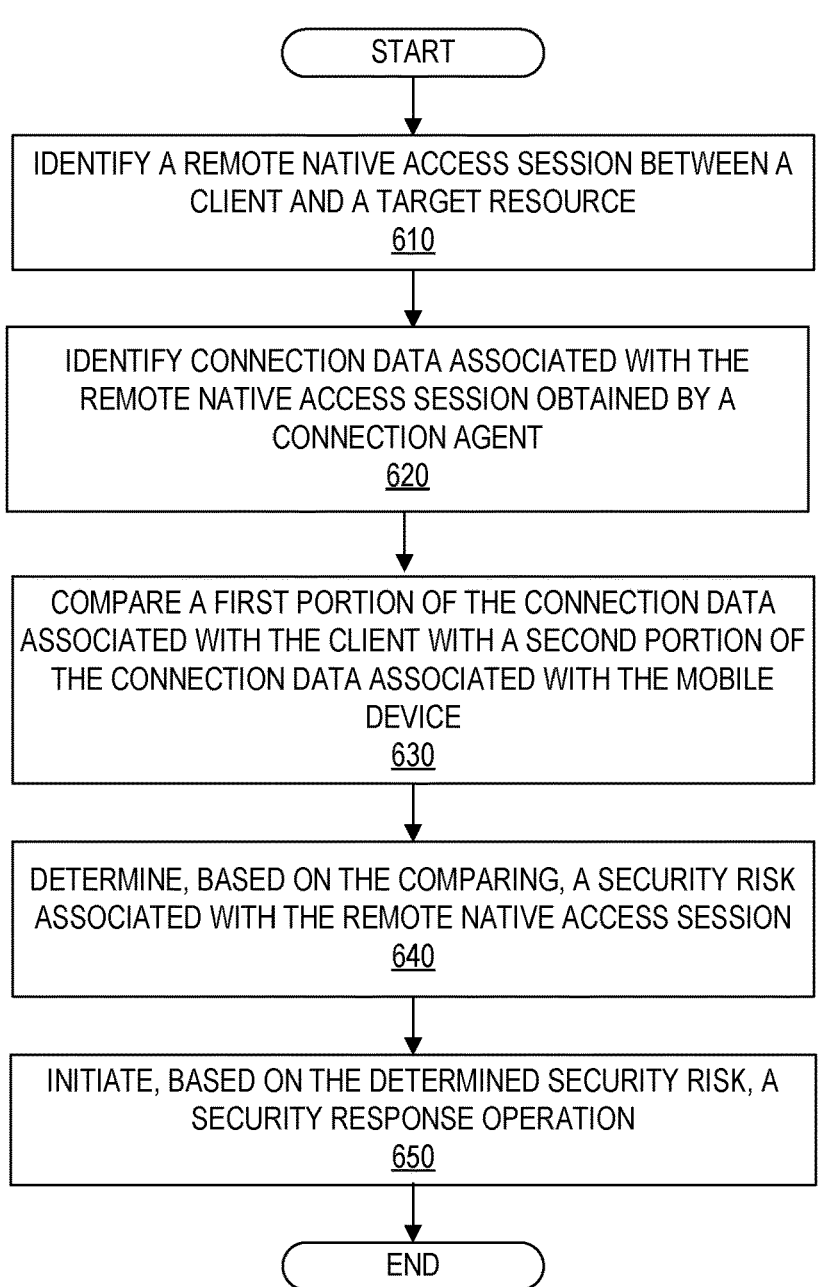
FIG. 6 is a flowchart depicting an example process for detection of security risks based on secretless connection data, consistent with the disclosed embodiments.

FIG. 6 is a flowchart depicting an example process 600 for detection of security risks based on secretless connection data, consistent with the disclosed embodiments. Process 600 may be performed by at least one processing device (e.g., cloud service 130, connector 122, etc.), such as processor 210 of connector 122, as described above. It is to be understood that throughout the present disclosure, the term "processor" is used as a shorthand for "at least one processor." In other words, a processor may include one or more structures that perform logic operations whether such structures are collocated, connected, or disbursed. In some embodiments, a non-transitory computer readable medium may contain instructions that when executed by a processor cause the processor to perform process 600. Further, process 600 is not necessarily limited to the steps shown in FIG. 6, and any steps or processes of the various embodiments described throughout the present disclosure may also be included in process 600, including those described above with respect to FIGS. 3 and 5.

In step 610, process 600 may include identifying a remote native access session between a client 114 and a target resource 128. For example, step 610 may identify a remote native access session between client device 114 and target resource 128. The remote native access session may be identified in various ways. In some embodiments, the remote native access session may be a remote desktop (e.g., RDP or other) connection.

In step 620, process 600 may include identifying connection data associated with the remote native access session obtained by a connection agent 126, wherein the connection data originates from the client 114 and from a mobile device 116 associated with a user 112, and comprises data indicative of at least one of: hardware of the client or mobile device, configuration settings of the client or mobile device, and network connection attributes of the client or mobile device. For example, at step 620, the connection data may be derived from one or more different places including hardware of the client 114, configuration settings, or network connection attributes.

In step 630, process 600 may include comparing a first portion of the connection data associated with the client 114 with a second portion of the connection data associated with the mobile device 116. For example, at step 630, portions of the connection data derived from one or more different places may be compared to each other. In some embodiments, the comparison may be based on only a portion (a first portion of the connection data associated with the client and a second portion associated with the mobile device).

In step 640, process 600 may include determining, based on the comparing, a security risk associated with the remote native access session. For example, at step 640, the system may determine a security risk or level of risk based on the comparison performed in step 630.

In step 650, process 600 may include initiating, based on the determined security risk, a security response operation. For example, step 650 may include the system providing a security response operation such as a security notification (e.g., "change your password" or "your session may be dangerous," etc.) or a security notification describing the threat incident to an administer or prompt a security center with a notification about the incident (e.g., "a threat is detected, "malicious connection is being made," or "your organization is under attack," etc.). As discussed above, however, various types of security responses are possible.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials, and code types will be developed, and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for detecting and addressing security risks in remote native access sessions, the operations comprising:

identifying a first remote native access session between a user device associated with a user and a target resource;

identifying a second remote native access session of a mobile device associated with the user and the target resource, wherein the first remote native access session and the second remote native access session are established using a connection agent associated with the target resource;

obtaining, based on the identification of the first remote native access session and the second remote native access session, connection data exchanged during the first remote native access session and the second remote native access session, wherein the connection data includes:

first connection data originating from the user device during the first remote native access session, wherein the first connection data comprises data indicative of at least one of a hardware, a configuration setting, or a network connection attribute of the user device, and second connection data originating from the mobile device during the second remote native access session, wherein the second connection data comprises data indicative of at least one of a hardware, a configuration setting, or a network connection attribute of the mobile device;

comparing, using the connection agent, the first connection data with the second connection data to identify at least one of a hardware aspect, a configuration setting, or a network connection attribute that is inconsistent between the user device and the mobile device;

determining, based on the at least one of the hardware aspect, the configuration setting, or the network connection attribute that is inconsistent between the user device and the mobile device, a security risk associated with at least one of the first remote native access session or the second remote native access session; and performing, based on the determined security risk, a security response operation in at least one of the first remote native access session or the second remote native access session, wherein the security response operation includes suspending or terminating at least one of the first remote native access session or the second remote native access session.

2. The non-transitory computer readable medium of claim 1, wherein the security response operation further includes sending an identification of the security risk to a network security platform.

3. The non-transitory computer readable medium of claim 1, wherein the security response operation further includes at least one of: limiting network rights of the client or limiting local rights of the client.

4. The non-transitory computer readable medium of claim 1, wherein the security response operation further includes at least one of: generating an alert, making an audit record, or generating a report.

5. The non-transitory computer readable medium of claim 1, wherein the security response operation further includes at least one of: requesting authorization from an administrator or requesting authentication from the client.

6. The non-transitory computer readable medium of claim 1, wherein the connection agent is configured to intercept the connection data.

7. The non-transitory computer readable medium of claim 1, wherein the connection agent is configured to transmit the connection data to a security service that performs the comparing.

8. The non-transitory computer readable medium of claim 1, wherein the connection data includes handshake data associated with at least one of the first remote native access session and the second remote native access session.

9. The non-transitory computer readable medium of claim 1, wherein the security response operation further includes at least one of: restricting at least one of first remote native access session or the second remote native access session, limiting access rights, generating a security alert, recording the at least one of first remote native access session or the second remote native access session, or requesting additional authentication.

10. A computer-implemented method for detecting and addressing security risks in remote native access sessions, the method comprising:

identifying a first remote native access session between a user device associated with a user and a target resource;

identifying a second remote native access session of a mobile device associated with the user and the target resource, wherein the first remote native access session and the second remote native access session are established using a connection agent associated with the target resource;

obtaining, based on the identification of the first remote native access session and the second remote native access session, connection data exchanged during the first remote native access session and the second remote native access session, wherein the connection data includes:

first connection data originating from the user device during the first remote native access session, wherein the first connection data comprises data indicative of at least one of a hardware, a configuration setting, or a network connection attribute of the user device, and second connection data originating from the mobile device during the second remote native access session, wherein the second connection data comprises data indicative of at least one of a hardware, a configuration setting, or a network connection attribute of the mobile device;

comparing, using the connection agent, the first connection data with the second connection data to identify at least one of a hardware aspect, a configuration setting, or a network connection attribute that is inconsistent between the user device and the mobile device;

determining, based on the at least one of the hardware aspect, the configuration setting, or the network connection attribute that is inconsistent between the user device and the mobile device, a security risk associated with at least one of the first remote native access session or the second remote native access session; and performing, based on the determined security risk, a security response operation in at least one of the first remote native access session or the second remote native access session, wherein the security response operation includes suspending or terminating at least one of the first remote native access session or the second remote native access session.

11. The computer-implemented method of claim 10, wherein the security risk is determined as a probability or score, and wherein the first connection data and the second connection data each have corresponding weights.

12. The computer-implemented method of claim 10, wherein the security risk is determined based on a difference in time zone between the user device and the mobile device.

13. The computer-implemented method of claim 10, wherein the security risk is determined based on a difference in geographic location between the user device and the mobile device.

14. The computer-implemented method of claim 10, wherein the security risk is determined based on a difference in keyboard type between the user device and the mobile device.

15. The computer-implemented method of claim 10, wherein the security risk is determined based on a difference in network address information between the user device and the mobile device.

16. The computer-implemented method of claim 10, wherein the security risk is determined based on a difference in a software setting between the user device and the mobile device.

17. The computer-implemented method of claim 10, wherein the security risk is determined based on a behavioral profile developed for the user device or the mobile device.

18. The computer-implemented method of claim 10, wherein the connection data further comprises sensor data from the user device or the mobile device.

19. The computer-implemented method of claim 18, wherein the sensor data indicates detected motion.

\* \* \* \* \*